United States Patent
Shikii et al.

(10) Patent No.: US 10,371,402 B2
(45) Date of Patent: Aug. 6, 2019

(54) SENSOR MOUNTING DEVICE

(71) Applicant: Panasonic Intellectual Property Corporation of America, Torrance, CA (US)

(72) Inventors: Shinichi Shikii, Nara (JP); Koichi Kusukame, Osaka (JP); Nawatt Silawan, Osaka (JP); Tatsuo Itoh, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/782,361

(22) Filed: Oct. 12, 2017

(65) Prior Publication Data

US 2018/0045428 A1   Feb. 15, 2018

Related U.S. Application Data

(62) Division of application No. 14/414,191, filed as application No. PCT/JP2014/002525 on May 13, 2014, now Pat. No. 9,841,202.

(30) Foreign Application Priority Data

May 17, 2013   (JP) ................. 2013-105305

(51) Int. Cl.
F24F 13/24   (2006.01)
F24F 11/30   (2018.01)
(Continued)

(52) U.S. Cl.
CPC .............. *F24F 11/30* (2018.01); *F24F 11/77* (2018.01); *F24F 11/79* (2018.01); *F24F 11/89* (2018.01);
(Continued)

(58) Field of Classification Search
CPC .. F24F 11/30; F24F 11/79; F24F 11/77; F24F 11/89; F24F 2110/10; F24F 2120/12; F24F 2120/10; G01D 11/30
See application file for complete search history.

(56) References Cited

U.S. PATENT DOCUMENTS 5,441,476 A   8/1995 Kitado
5,875,639 A   3/1999 Kim
(Continued)

FOREIGN PATENT DOCUMENTS

CN   101476765   7/2009
EP   2 508 812   10/2012
(Continued)

OTHER PUBLICATIONS

International Search Report dated Aug. 26, 2014 in International (PCT) Application No. PCT/JP2014/002525.
(Continued)

*Primary Examiner* — Robert E Fennema
*Assistant Examiner* — Marzia T Monty
(74) *Attorney, Agent, or Firm* — Wenderoth, Lind & Ponack, L.L.P.

(57) ABSTRACT

A sensor mounting device (100) of the present disclosure includes: a power supply unit (110) configured to generate power that is to be supplied to the device; a sensor (120) configured to acquire information of the environment around of the device; a first control unit (130) configured to give an instruction based on the information acquired by the sensor (120); and a second control unit (150) configured to control the device in accordance with the instruction of the first control unit (130). Power to the sensor (120) and the first control unit (130) is directly supplied from the power supply unit (110). Power to the second control unit (150) is supplied from the power supply unit (110) via a switching unit (140)
(Continued)

whose ON/OFF state is controlled by the first control unit (130).

9 Claims, 26 Drawing Sheets

Related U.S. Application Data

(60) Provisional application No. 61/891,473, filed on Oct. 16, 2013.

(51) Int. Cl.
    *F24F 11/89*     (2018.01)
    *G01D 11/30*     (2006.01)
    *F24F 11/77*     (2018.01)
    *F24F 11/79*     (2018.01)
    *F24F 120/10*     (2018.01)
    *F24F 120/12*     (2018.01)
    *F24F 110/10*     (2018.01)

(52) U.S. Cl.
    CPC .......... *G01D 11/30* (2013.01); *F24F 2110/10* (2018.01); *F24F 2120/10* (2018.01); *F24F 2120/12* (2018.01)

(56) References Cited

U.S. PATENT DOCUMENTS

| | | | | |
|---|---|---|---|---|
| 6,536,675 | B1* | 3/2003 | Pesko | F24F 13/24 165/238 |
| 8,768,520 | B2* | 7/2014 | Oexman | A47C 27/061 700/276 |
| 9,513,642 | B2* | 12/2016 | Rogers | G05D 23/1904 |
| 2005/0277381 | A1 | 12/2005 | Banerjee | |
| 2007/0114292 | A1* | 5/2007 | Breed | B60H 1/00742 236/49.3 |
| 2007/0241203 | A1 | 10/2007 | Wagner | |
| 2010/0271217 | A1 | 10/2010 | Kates | |
| 2012/0031984 | A1 | 2/2012 | Feldmeier | |
| 2015/0204556 | A1 | 7/2015 | Kusukame | |

FOREIGN PATENT DOCUMENTS

| | | |
|---|---|---|
| JP | 05-203233 | 8/1993 |
| JP | 10-191560 | 7/1998 |
| JP | 2001-193985 | 7/2001 |
| JP | 2005-241056 | 9/2005 |
| JP | 2006-128831 | 5/2006 |
| JP | 2010-133692 | 6/2010 |
| JP | 2011-009890 | 1/2011 |
| JP | 2011-069553 | 4/2011 |
| JP | 2011-122732 | 6/2011 |
| JP | 2013-024463 | 2/2013 |
| WO | 2011/067926 | 6/2011 |

OTHER PUBLICATIONS

Machine Translation of JP 2011-69553 having a publication date of Apr. 7, 2011.

Machine Translation of JP 2013-24463 having a publication date of Feb. 4, 2013.

Machine Translation of JP 10-191560 haying a publication date of Jul. 21, 1998.

Machine Translation of JP 2005-241056 having a publication date of Sep. 8, 2005.

Machine Translation of JP 05-203233 haying a publication date of Aug. 10, 1993.

English Translation of the Search Report attached to the Office Action dated Jun. 2, 2017 in corresponding Chinese Patent Application No. 201480001821.5.

\* cited by examiner

SENSOR MOUNTING DEVICE

TECHNICAL FIELD

The present disclosure relates to a device equipped with a sensor such as a temperature sensor.

BACKGROUND ART

In recent years, in various devices such as air conditioning appliances, freezing-refrigeration appliances, illumination appliances, cleaning appliances, and display appliances; surrounding environment that fluctuates is sensed by various sensors installed on the devices, and the devices are controlled based on data and information obtained by the sensing. By performing such a control, improvements are made for providing a user with a further comfortable living environment.

For example, one example that is well known in an air conditioning appliance is a control of adjusting room temperature by measuring, using a temperature sensor installed in the air conditioning appliance, the temperature of wind that has been sucked into the air conditioning appliance, and changing the intensity or the like of wind blown out from the air conditioning appliance based on the measured wind temperature. In addition, for example, as disclosed in Patent Literature 1, it is conceivable to perform further fine room air-conditioning control by detecting body movement of a person during sleep based on information obtained by a two-dimensional infrared sensor installed in the air conditioning appliance, and determining the state of the sleep.

CITATION LIST

Patent Literature

[PTL 1] Japanese Laid-Open Patent Publication No. 2010-133692

SUMMARY OF THE INVENTION

Problems to be Solved by the Invention

However, in a conventional air conditioning appliance, when power of the appliance is not turned on, i.e., when the appliance is not operating (shut down), the sensor also does not operate. Thus, after when power of the air conditioning appliance is turned off by a user himself/herself, or after when power of the air conditioning appliance is turned off by timer activation, etc., the sensor cannot operate and control of room air-conditioning cannot be performed.

In the present disclosure, a device that is equipped with a sensor for solving the above described problem will be described.

Solution to the Problems

A device equipped with a sensor of the present disclosure includes: a power supply unit configured to generate power that is to be supplied to the device; a sensor configured to acquire information of an environment around the device; a first control unit configured to give an instruction based on the information acquired by the sensor; and a second control unit configured to control the device in accordance with the instruction of the first control unit. Power to the sensor and the first control unit is directly supplied from the power supply unit. Power to the second control unit is supplied from the power supply unit via a switching unit whose ON/OFF state is controlled by the first control unit.

Advantageous Effects of the Invention

With the device equipped with the sensor disclosed above, since the sensor is in operation even when the device is shut down, operation of the device can be started if necessary. With this, convenience and comfort, etc., of the user can be improved.

DESCRIPTION OF EMBODIMENTS

Figure 1:
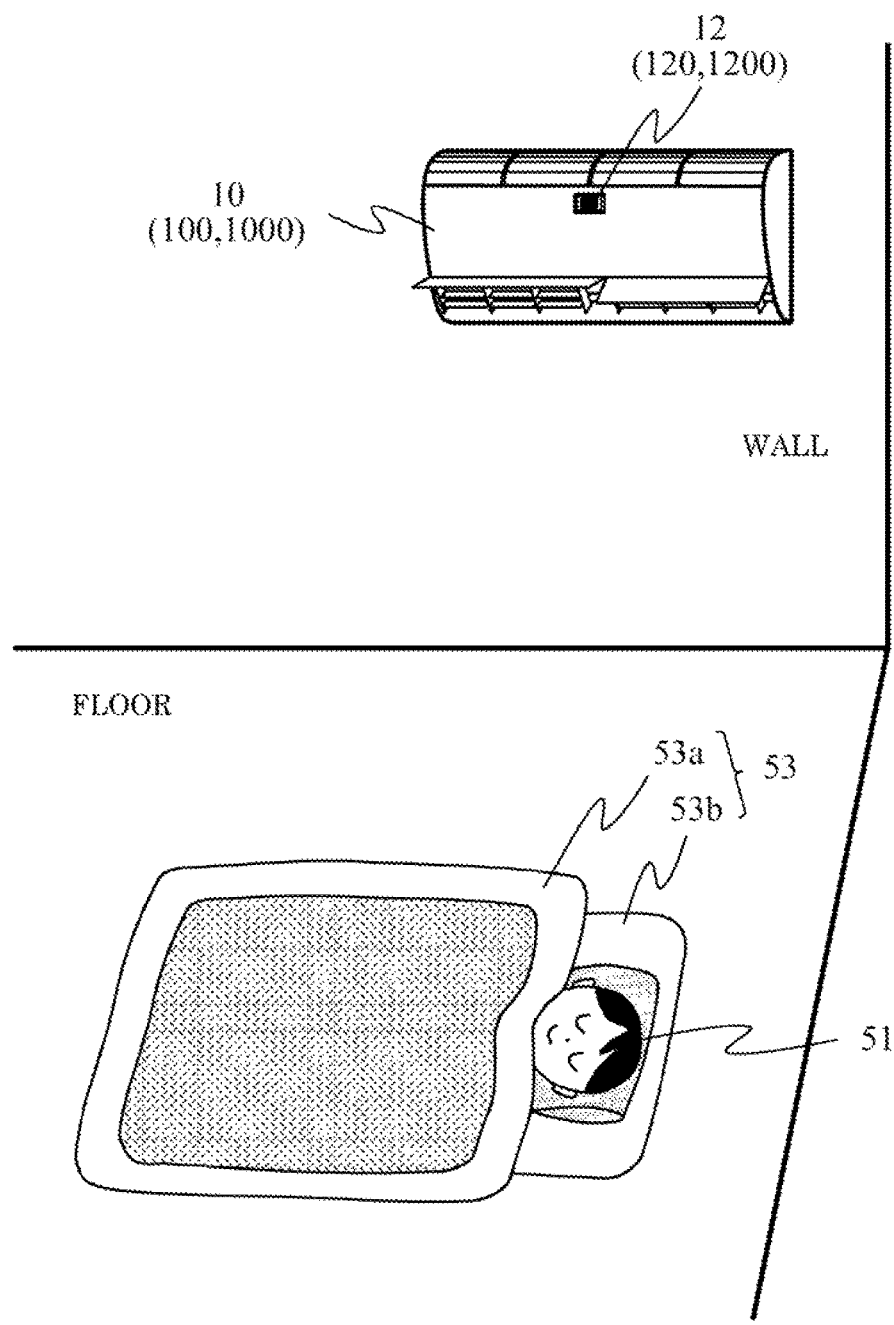
FIG. 1 is a schematic diagram inside a room in which a device is provided.

In the following, embodiments of the present invention will be described with reference to the drawings. It should be noted that explanation may be omitted by giving the same reference character to the same component. Furthermore, in some parts of the drawings, for the purpose of making the content of disclosure easily understandable, a specific component may be shown schematically, simplified, or omitted if necessary.

Findings that Became the Basis of the Present Invention

FIG. 1 schematically shows the inside of a room in which a device 10 is provided. The device 10 illustrated in FIG. 1 is an air conditioning appliance equipped with a sensor 12, and is attached to the surface of a wall in the room. A person (user) 51 is sleeping in a bedding 53c consisting of a bed cover 53a and a mattress 53b. Hereinafter, this person who is sleeping is described as a sleeper 51.

Figure 22:
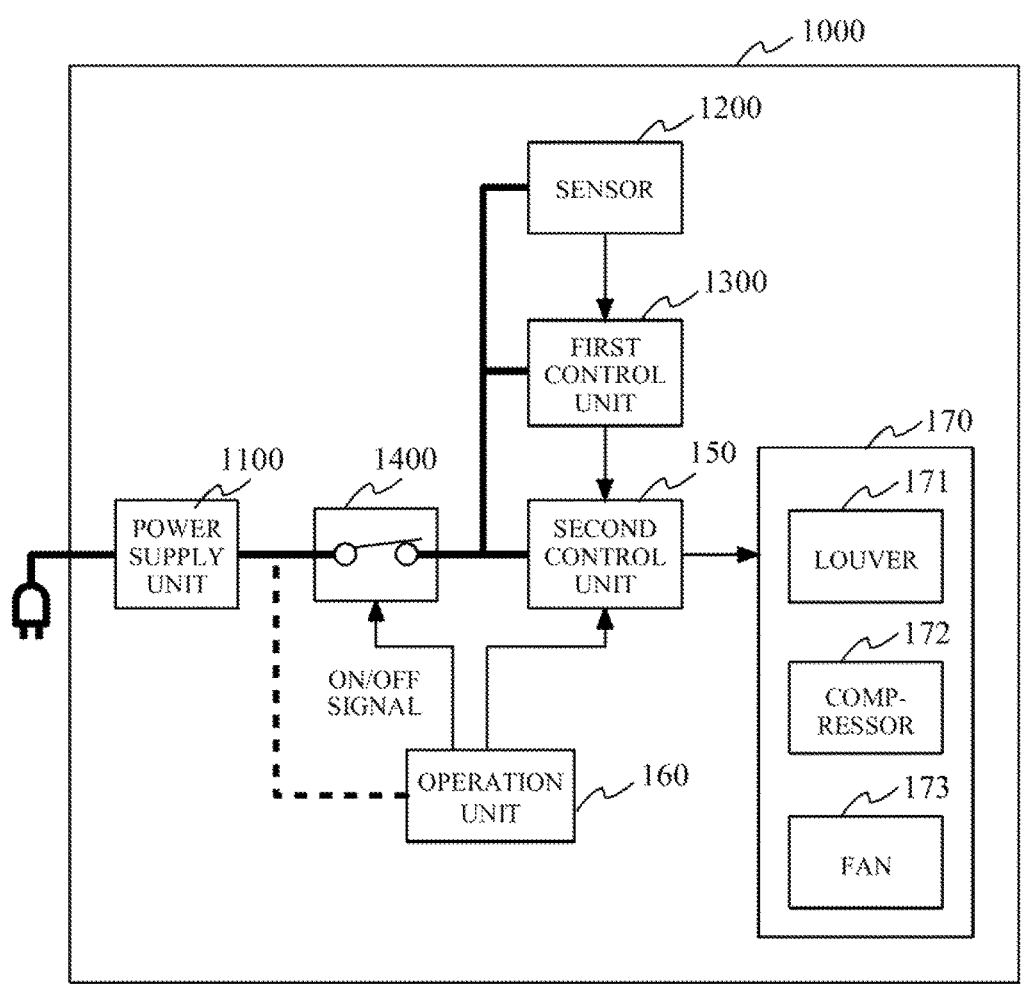
FIG. 22 shows the configuration of a hitherto known air conditioning appliance 1000.

FIG. 22 shows the configuration of a conventional air conditioning appliance 1000 used as the device 10 in the situation of FIG. 1 described above.

The conventional air conditioning appliance 1000 shown in FIG. 22 includes a power supply unit 1100, a sensor 1200, a first control unit 1300, a switching unit 1400, a second control unit 150, an operation unit 160, and a device functional unit 170. The device functional unit 170 includes a louver 171, a compressor 172, and a fan 173, etc.

In the conventional air conditioning appliance 1000, the power supply unit 1100, to which a first source power (e.g., AC 100V etc.) is inputted from outside, generates a second source power (e.g., DC 12V etc.) necessary for the appliance. The second source power generated by the power supply unit 1100 is supplied to the switching unit 1400 (also to the operation unit 160 if necessary). The switching unit 1400 is formed such that its ON/OFF state can be switched based on a control by the operation unit 160. When the switching unit 1400 is in the ON-state, the switching unit 1400 outputs the second source power inputted from the power supply unit 1100 to components in the subsequent stages. The components in the subsequent stages to which the switching unit 1400 outputs the second source power include the sensor 1200, the first control unit 1300, and the second control unit 150.

The sensor 1200 corresponds to the sensor 12 in FIG. 1, and is, for example, a temperature sensor for acquiring information (measuring data) regarding room temperature. As the temperature sensor, a thermal image sensor or the like capable of measuring a two-dimensional temperature distribution is suitable. The information (measured data) acquired by the sensor 1200 is outputted to the first control unit 1300. The first control unit 1300 extracts feature values from the information acquired by the sensor 1200. Examples of the feature values include presence of a person inside the room, a position where the person exists, and the person's face temperature, etc. From these feature values, the first control unit 1300 can comprehend what control is necessary for the room at the moment, such as to which direction (derived from the position of the person) should the wind be directed, and what temperature should the wind that is to be blown out have (derived from the face temperature etc.), etc. A control content that has been comprehended by the first control unit 1300 is outputted to the second control unit 150. The second control unit 150 is connected to the device functional unit 170, and separately adjusts, based the control content received from the first control unit 1300, the wind direction through the louver 171, the wind temperature through the compressor 172, and the wind volume through the fan 173. In addition, the second control unit 150 can adjust the wind direction, the wind temperature, and the wind volume in a similar manner based a control content instructed from the operation unit 160.

However, with the conventional air conditioning appliance 1000 described above, a problem as described in the following occurs.

For example, considered next is a case in which a person goes to sleep while having the air conditioning appliance 1000 operating with an OFF timer being set. In this case, after the time period set by the timer (the operation unit 160) elapses, since the switching unit 1400 is switched to the OFF-state by a signal from the timer, the entire air conditioning appliance 1000, including the operation of the sensor 1200, is shut down.

After the air conditioning appliance 1000 is shut down, it is expected that the room temperature will rise during summer whereas the room temperature will fall during winter. However, since the sensor 1200 is shut down, the air conditioning appliance 1000 cannot sense the change in the room temperature. Thus, it is conceivable that the sleeper 51 may not be able to sleep comfortably, and, in worst case, may wake up. Although one can conceivably set the ON timer for having the air conditioning appliance 1000 automatically start operating, since the operation can be started only after the time period that has been set prior to going to sleep has elapsed, it is not possible to properly deal with the unpredictable change in the room temperature.

Thus, the conventional air conditioning appliance 1000 has a problem of not being able to use functions utilizing the sensor 1200 since the sensor 1200 and the first control unit 1300 do not operate unless power of the appliance main body is turned on, i.e., the switching unit 1400 is switched to the ON-state.

Technique on which the Present Inventors have Focused

In response to the above described problem, the present inventors have focused on, in a device equipped with a sensor, keeping the sensor operational even when main functional parts of the device are shut down through termination of power, and have come up with a new original idea regarding a device that improves convenience and comfort etc., of a user.

Various modes based on the new original idea are described next.

General Outline of Various Modes of the Invention

A device equipped with a sensor according to one mode of the present disclosure based on the invention includes: a power supply unit configured to generate power that is to be supplied to the device; a sensor configured to acquire information of an environment around of the device; a first control unit configured to give an instruction based on the information acquired by the sensor; and a second control unit configured to control the device in accordance with the instruction of the first control unit. Power to the sensor and the first control unit is directly supplied from the power supply unit. Power to the second control unit is supplied from the power supply unit via a switching unit whose ON/OFF state is controlled by the first control unit.

Furthermore, the sensor may include at least one of a temperature sensor and a humidity sensor.

According to this one mode, the sensor and the first control unit can be operated even when the device is shut down.

According to this one mode, when information requiring operation of the device is acquired by the sensor while the switching unit is in an OFF-state, the first control unit can switch the switching unit to an ON-state and give an instruction to the second control unit.

According to this one mode, it is possible to start the operation of the device if necessary through the first control unit. With this, convenience and comfort, etc., of the user can be improved.

Here, for example, when new information, regarding the environment around of the device but not different from previously acquired information regarding the environment around of the device, is acquired by the sensor; the first control unit can reduce power consumption of the device by not giving to the second control unit an instruction based on the new information regarding the environment around of the device.

In another one mode, for example, the first control unit can transmit, externally from the device, the instruction based on the information acquired by the sensor.

Furthermore, by transmitting, externally from the device, the instruction based on the information acquired by the sensor, the first control unit can remotely control a separate device that has received the instruction.

According to this other one mode, a separate device other than the present device can be controlled easily.

Here, for example, when new information, regarding the environment around of the device but not different from previously acquired information regarding the environment around of the device, is acquired by the sensor; the first control unit can reduce power consumption of the device by not transmitting the instruction externally from the device.

Furthermore, in another one mode, for example, the sensor can acquire the information regarding the environment around of the device at a predetermined time interval.

Here, for example, when new information, regarding the environment around of the device but not different from previously acquired information regarding the environment around of the device, is acquired by the sensor; the first control unit can change the time interval at which the sensor acquires the information regarding the environment around of the device, or change an interval at which the new information regarding the environment around of the device is processed. With this, power consumption of the device can be reduced.

In another one mode, for example, the first control unit can estimate a person's behavior or the state of a bedding during sleep based on information regarding the environment around of the device acquired by the sensor.

When the device equipped with the sensor is an air conditioning appliance, the first control unit can, by giving an instruction to the second control unit, control at least one of, for example, blowing/stopping, direction, intensity, temperature, and humidity of wind.

Furthermore, when the device equipped with the sensor is a display device, the first control unit can, for example, control selecting of contents to be displayed on a display unit by giving an instruction to the second control unit.

Furthermore, the first control unit can: remotely control at least one of blowing/stopping, direction, intensity, temperature, and humidity of wind through a separate device having an air conditioning function; remotely control at least one of turning on/off and dimming of illumination through a separate device having an illumination function; remotely control at least one of starting/stopping, location, and time of cleaning through a separate device having a cleaning function; or remotely control at least one of temperature, and starting/stopping freezing and/or refrigeration through a separate device having freezing and/or refrigeration function.

According to this other one mode, various separate devices can be easily operated remotely.

Detailed Description of Each Mode of the Invention

First Embodiment

Figure 2:
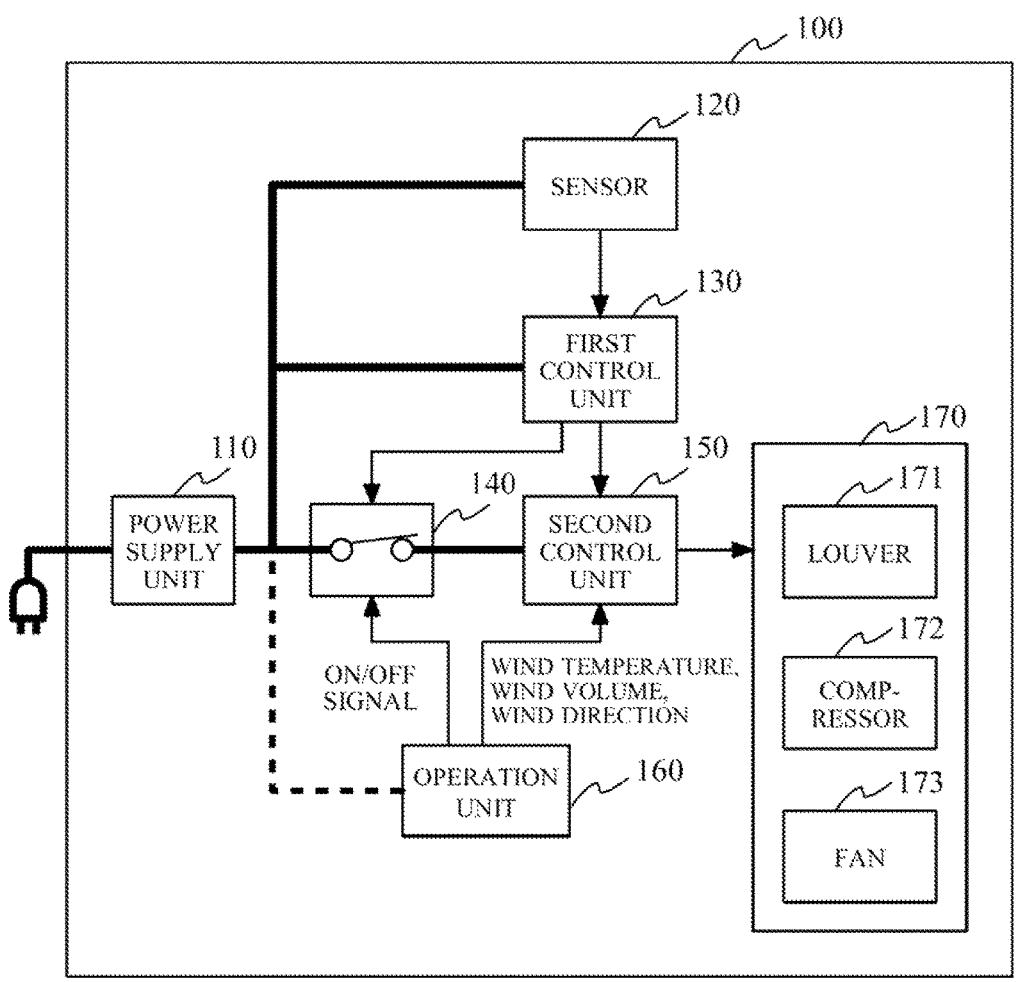
FIG. 2 shows the configuration of an air conditioning appliance 100 according to a first embodiment.

FIG. 2 shows the configuration of an air conditioning appliance 100 according to a first embodiment of the present disclosure, used as the device 10 in the situation of FIG. 1 described above.

The air conditioning appliance 100 shown in FIG. 2 includes a power supply unit 110, a sensor 120, a first control unit 130, a switching unit 140, the second control unit 150, the operation unit 160, and the device functional unit 170. The device functional unit 170 includes the louver 171, the compressor 172, and the fan 173, etc. It should be noted that the components of the device functional unit 170 are merely examples, and other components may be included or part of the components may be omitted.

In the air conditioning appliance 100, the power supply unit 110, to which a first source power (e.g., AC 100V etc.) is inputted from outside, generates a second source power (e.g., DC 12V etc.) necessary for the appliance. The second source power generated by the power supply unit 110 is supplied to the sensor 120, the first control unit 130, and the switching unit 140 (also to the operation unit 160 if necessary). The switching unit 140 is formed such that its ON/OFF state can be switched based on a control by the operation unit 160. When the switching unit 140 is in the ON-state, the switching unit 140 outputs the second source power inputted from the power supply unit 110 to components in the subsequent stages. The switching unit 140 may be either a mechanical switch or an electrical switch, and may be controlled through hardware or software. The components in the subsequent stages to which the switching unit 140 outputs the second source power include the second control unit 150. The operation unit 160 is a wireless or wired operation terminal, and is representatively a remote controller (remote). In addition, the operation unit 160 is a concept having a timer function capable of switching the ON/OFF state of the switching unit 140 at any set time. In the case where the operation unit 160 wirelessly operates the switching unit 140, the switching unit 140 has a reception function.

The sensor 120 is, for example, a temperature sensor, and acquires information (measures data) regarding room temperature. As the temperature sensor, a thermal image sensor or the like capable of measuring a two-dimensional temperature distribution is suitable. The information (measured data) acquired by the sensor 120 is outputted to the first control unit 130. The first control unit 130 extracts feature values from the information acquired by the sensor 120. Examples of the feature values include presence of a person inside the room, a position where the person exists, and the person's face temperature, etc. From these feature values, the first control unit 130 can comprehend what control is necessary for the room at the moment, such as to which direction (derived from the position of the person) should the wind be directed, and what temperature should the wind that is to be blown out have (derived from the face temperature etc.), etc. A control content that has been comprehended by the first control unit 130 is outputted to the second control unit 150. Here, the first control unit 130 has a function of switching the ON/OFF state of the switching unit 140 such that a control content outputted to the second control unit 150 is executed. The second control unit 150 and the device functional unit 170 are as described above. The first control unit 130 and the second control unit 150 are not particularly limited as long as they are, for example, a microcomputer or the like capable of performing appliance control function and arithmetic processing, and the two control units may be an single component.

The configuration of the air conditioning appliance 100 according to the first embodiment is different from the configuration of the conventional air conditioning appliance 1000 regarding the points described below.

First, power to the sensor 120 and the first control unit 130 is directly supplied from the power supply unit 110 not through the switching unit 140. Next, the first control unit 130 has a function of switching the ON/OFF state of the switching unit 140.

Figure 3:
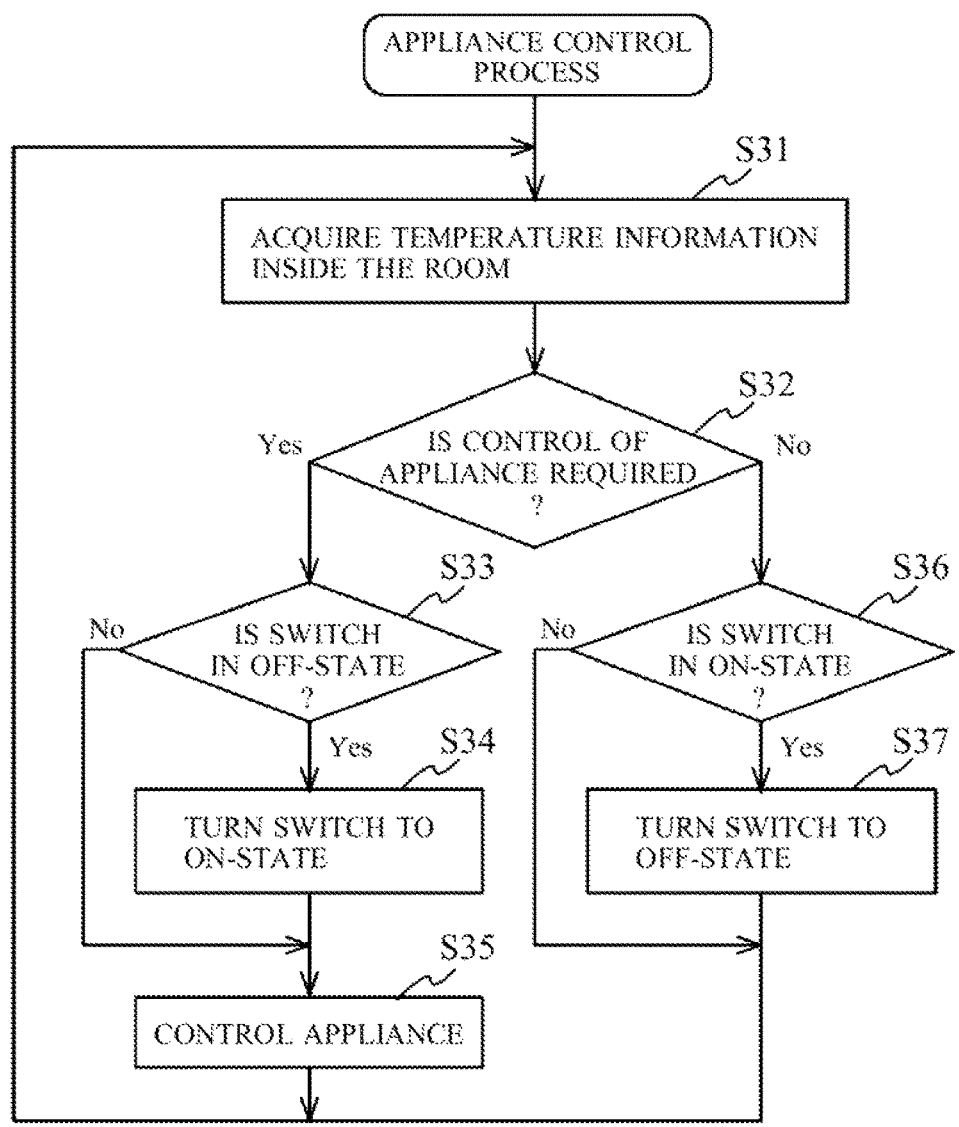
FIG. 3 is a flowchart describing an appliance control performed by the air conditioning appliance 100.

In the following, the function achieved by the air conditioning appliance 100 of the first embodiment because of the configuration different from that described above will be described with reference also to FIG. 3. FIG. 3 is a flowchart describing an appliance control performed by the air conditioning appliance 100 of the first embodiment.

Since power to the sensor 120 and the first control unit 130 is directly supplied from the power supply unit 110 not through the switching unit 140, the sensor 120 and the first control unit 130 are constantly in operation. More specifically, even when the switching unit 140 is in the OFF-state and the second control unit 150 is not in operation, i.e., functions of the air conditioning appliance 100 is shut down; the inside of the room is monitored by the sensor 120 and information regarding temperature (distribution) is obtained (step S31). In addition, even when the functions of the air conditioning appliance 100 are shut down, the information acquired by the sensor 120 is transmitted to the first control unit 130, and the first control unit 130 performs a process of extracting feature values from the information and determining whether or not control of the appliance is necessary (step S32). Thus, it is possible to constantly maintain a state of being able to monitor the temperature inside the room and execute a control of the air conditioning appliance 100 based on the feature values. It should be noted that the act of monitoring by the sensor 120 may be performed continuously, or may be performed discretely at a predetermined time interval. In addition, the act of receiving information from the sensor 120 by the first control unit 130 may also be performed continuously, or may be performed discretely at a predetermined time interval.

Furthermore, since the first control unit 130 has a function of switching the ON/OFF state of the switching unit 140, the state of the switching unit 140 can be controlled whenever necessary.

More specifically, even when the switching unit 140 is in the OFF-state and the second control unit 150 is not in operation, i.e., functions of the air conditioning appliance 100 is shut down; the air conditioning appliance 100 can be made operational by switching the switching unit 140 to the ON-state (steps S33, S34). Thus, when it becomes a state requiring a control of the device based on the feature values as a result of constantly monitoring the temperature inside of the room (step S32: Yes), it is possible to immediately operate the air conditioning appliance 100 and adjust the room temperature to an optimal temperature (step S35). Even when the switching unit 140 is in the ON-state and the air conditioning appliance 100 is in operation, the air conditioning appliance 100 can be shut down by switching the switching unit 140 to the OFF-state (steps S36, S37). Thus, when it becomes a state not requiring a control of the device based on the feature values as a result of constantly monitoring the temperature inside the room (step S32: No), it is possible to immediately shut down the air conditioning appliance 100.

As specific examples using the functions of the sensor 120 and the first control unit 130, for example, various examples shown in the following are conceivable.

Specific Example 1

A specific example regarding sleep will be described.

After the air conditioning appliance 100 is shut down by the OFF timer or the like, the face temperature of the sleeper 51 can be sensed whether to be equal to or higher than a predetermined temperature using the sensor 120 and the first control unit 130. When this state is detected, the first control unit 130 determines that the environment temperature is high and uncomfortable for the sleeper 51, and switches the switching unit 140 to the ON-state. With this, the second control unit 150, i.e., the air conditioning appliance 100 can be operated. In this case, based the extracted feature values, since the first control unit 130 can determine toward which location, with what amount of wind volume, and with what temperature should the wind be generated; the first control unit 130 can output the determined control content to the second control unit 150, and properly control the louver 171, the compressor 172, and the fan 173.

With this control, since the temperature around the sleeper 51 can be held to be at a certain temperature or lower, the sleeper 51 can continue sleeping comfortably.

Here, although a case in which the temperature (distribution) inside the room is monitored and the face temperature is sensed has been described, it is needless to say that not only the face but, for example, the temperature of a hand or a foot may be sensed. Based on the temperature of a hand or a foot; wind volume, wind direction, and wind temperature of the air conditioning appliance 100 may be controlled all together or singly, or the operation/shutdown state of the appliance may be controlled. In particular, in a case where the sleeper 51 has oversensitivity to cold, since the decrease in temperature at a hand or a foot is significant, it is possible to provide a comfortable room condition even for the person with oversensitivity to cold by measuring the temperature of a hand or a foot.

Figure 4:
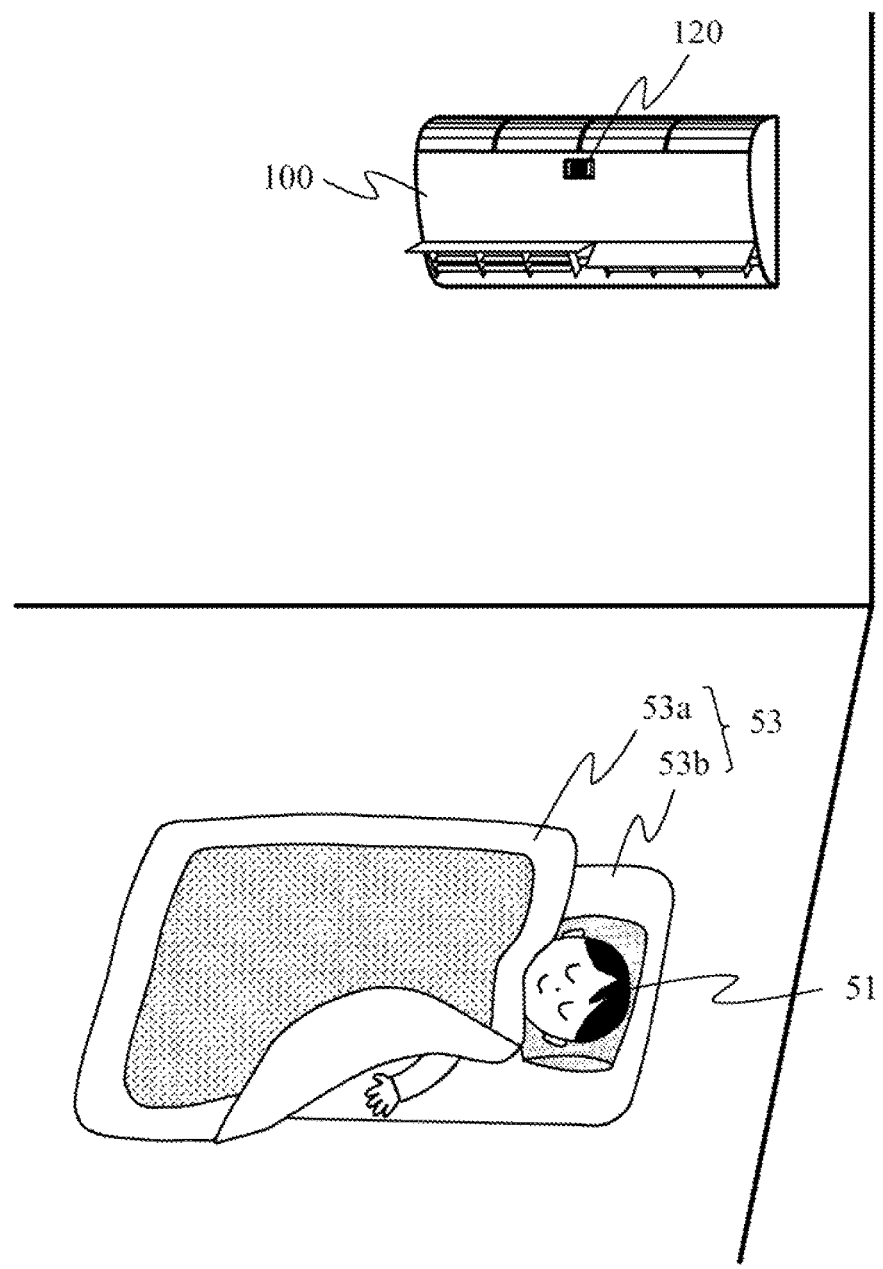
FIG. 4 is a schematic diagram describing a specific example 1 in which the air conditioning appliance 100 is used.

In addition, in the case of sensing the temperature of a hand or a foot of person among the temperature (distribution) inside the room, as shown in FIG. 4, for example, a hand or a foot of the sleeper 51 that has been exposed due to the bed cover 53a being rolled up can be detected. For example, if this is during summer, a comfortable room condition preventing a person from catching a cold can be provided, by controlling the operating condition (at least one of wind volume, wind direction, and wind temperature, etc.) of the air conditioning appliance 100, or controlling the operation/shutdown state of the appliance, such that the body temperature of the sleeper 51 is not lowered unnecessarily.

In addition, the first control unit 130 can determine whether or not the sleeper 51 has entered a sleeping state from the amount of body movement. Thus, for example, when a sleeping state of the sleeper 51 is detected, it is possible to control the air conditioning appliance 100 such that an operation sound of "peep" generated when starting up or shutting down the air conditioning appliance 100 is not produced until the sleeper 51 wakes up thereafter. By performing such a control, a comfortable environment can be maintained without obstructing the sleep of the sleeper 51. Similarly, when the sleeper 51 is determined to have entered a sleeping state, a comfortable environment can be maintained without obstructing the sleep of the sleeper 51 by moderating the operation of the compressor 172 or moderating the operation of the louver 171 and the fan 173 to reduce noise that is generated.

Specific Example 2

A specific example at the time of arousal will be described using FIG. 5.

Figure 5:
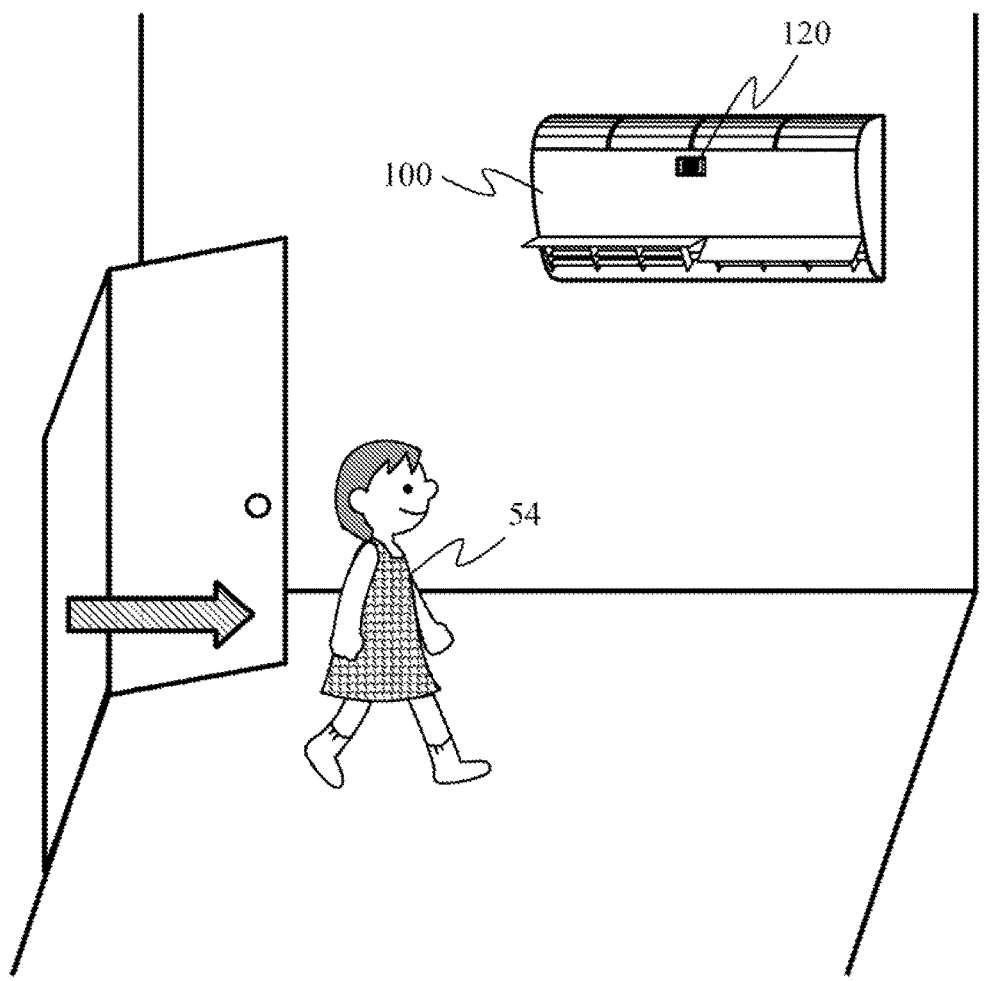
FIG. 5 is a schematic diagram describing a specific example 2 in which the air conditioning appliance 100 is used.

Since the sensor 120 and the first control unit 130 are in operation even when the air conditioning appliance 100 is shut down, it is possible to detect a person 54 (hereinafter, described as the room-entering person 54) who has entered the room as shown in FIG. 5. At this moment, for example, when his/her face temperature is sensed to be equal to or higher than a predetermined temperature by the sensor 120 and the first control unit 130, the first control unit 130 determines that the condition is uncomfortable for the room-entering person 54, and switches the switching unit 140 to the ON-state. With this, the second control unit 150, i.e., the air conditioning appliance 100, can be operated.

With this control, a comfortable condition can be provided to the room and the room-entering person 54 by holding the temperature around the room-entering person 54 equal to or lower than a certain temperature, or blowing wind, etc.

It is needless to say that when the face temperature of the room-entering person 54 is equal to or lower than a certain temperature, a control of increasing the temperature around the room-entering person 54 may be performed, or, when a humidity sensor is also attached as the sensor 120, a control of humidity may be performed. However, the control achieved by the sensor 120 and the first control unit 130 is not limited to this specific example. It is needless to say that the air conditioning appliance 100 may be operated using the detection of a person by the sensor 120 as a trigger, or the air conditioning appliance 100 may be operated using other changes as a trigger. In addition, when a person has left the room and is absent, the sensor 120 and the first control unit 130 can determine that there is nobody inside the room and shut down the air conditioning appliance 100. In this case, even after the shutdown, since the sensor 120 and the first control unit 130 are still in operation, operation of the air conditioning appliance 100 can be automatically started when somebody enters the room next.

Furthermore, as the component used as the sensor 120, other than the temperature sensor described in the examples, a humidity sensor, or both a temperature sensor and a humidity sensor may be used. It is understood that the degree of comfort for a person is generally also affected by the humidity, and it is known that, for example, in an environment of 30° C., a humidity equal to or higher than 60% is extremely uncomfortable, whereas it is sensed to be comfortable when the humidity is about 40% even when the temperature is high. Thus, a comfortable environment can be created similarly by sensing the humidity using a humidity sensor, deriving a comfortable condition by the first control unit 130 in a manner similar to the case with the temperature sensor, and controlling the louver 171, the compressor 172, and the fan 173, etc., through the second control unit 150. It is needless to say that, when both the temperature sensor and the humidity sensor are installed, a comfortable environment can be created more precisely.

It should be noted that in the embodiments described above, although the items controlled by the air conditioning appliance 100 are described as three items, i.e., wind volume, wind direction, and wind temperature; any one of those, all of those, or any item other than those may be included.

Specific Example 3

Figure 6:
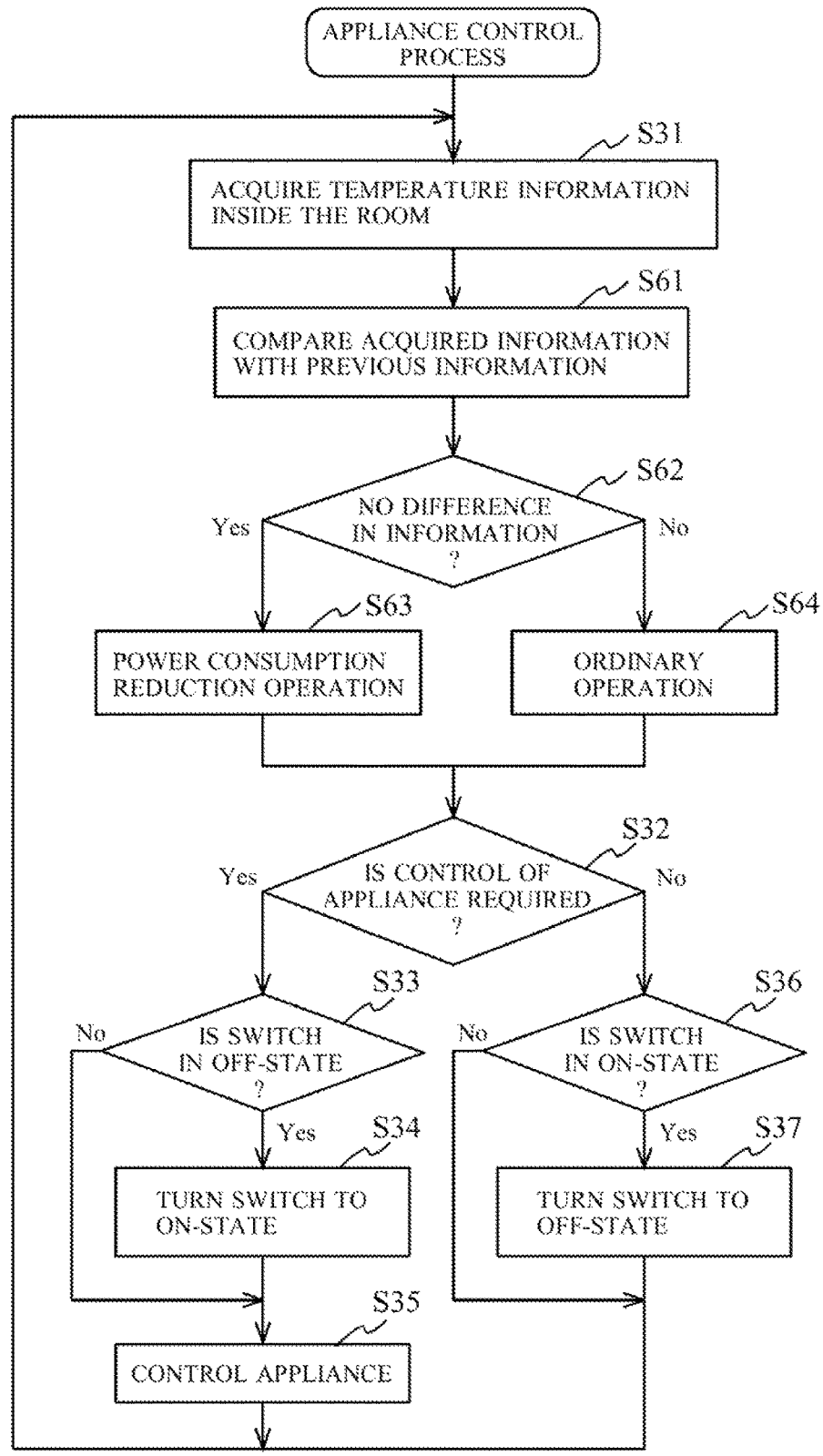
FIG. 6 is a flowchart describing a specific example 3 in which the air conditioning appliance 100 is used.

In the air conditioning appliance 100 of the present embodiment, the sensor 120 and the first control unit 130 are constantly in operation even when the air conditioning appliance 100 is shut down. As a result, there is a problem of increased power consumption when compared to the conventional air conditioning appliance 1000. Thus, improvements for reducing power consumption as much as possible while the air conditioning appliance 100 is shut down will be described. FIG. 6 is a flowchart obtained by adding, to the flowchart in FIG. 3, procedures (steps S61 to S64) for controlling power consumption.

When the first control unit 130 newly receives information (data) from the sensor 120 (step S31), the newly received information is compared to information previously received from the sensor 120 (step S61). If it is determined that there is no difference between the two sets of information (step S62: Yes), the first control unit 130 performs an operation for reducing power consumption, such as reducing the frequency at which the sensor 120 acquires information (measures data), reducing the capability (resolution or range) of the sensor 120, or prolonging the interval at which the first control unit 130 itself processes the information received from the sensor 120 (step S63). On the other hand, if it is determined that there is a difference between the two sets of information (step S62: No), the first control unit 130 performs an ordinary operation (step S64). At this moment, when the operation for reducing power consumption is being performed, the ordinary operation is restored.

With this control, in the air conditioning appliance 100 of the embodiments, power consumption can be properly reduced.

Second Embodiment

Figure 7:
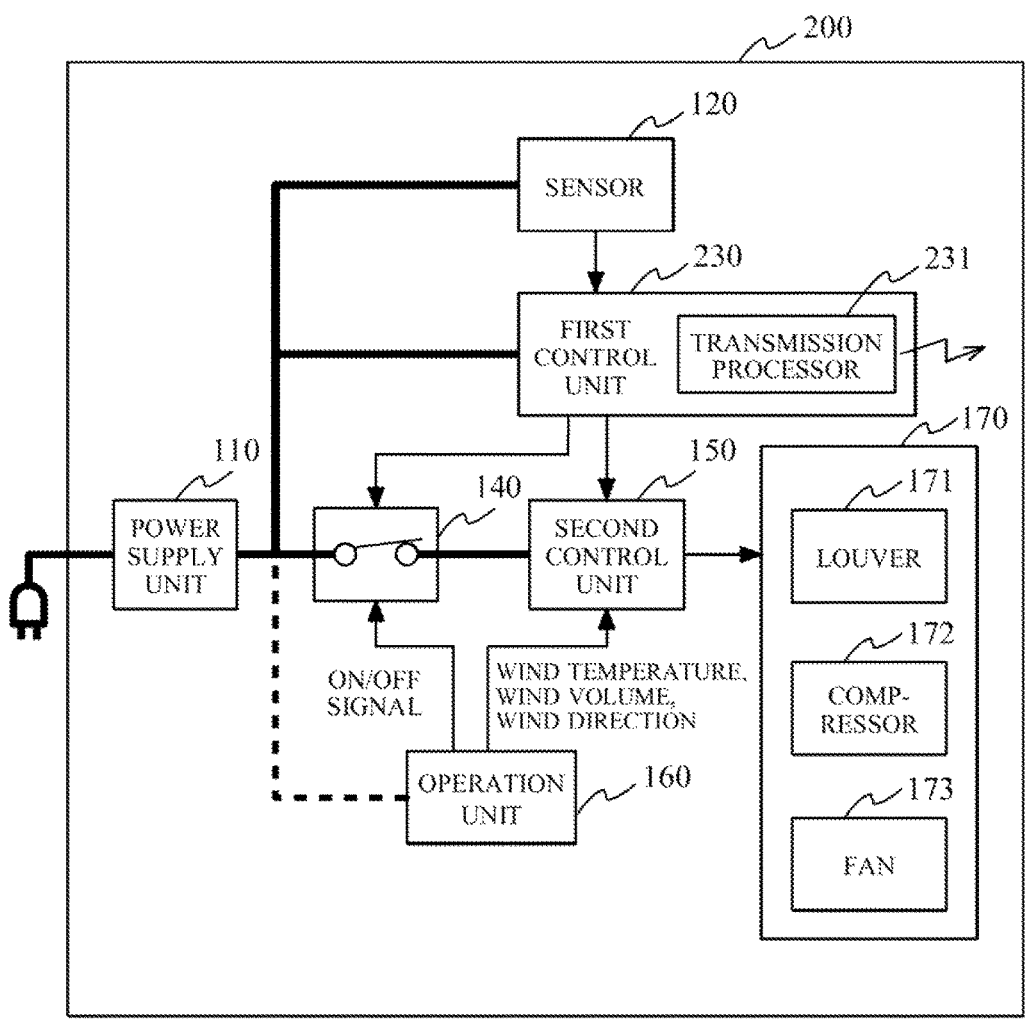
FIG. 7 shows the configuration of an air conditioning appliance 200 according to a second embodiment.

By using FIGS. 7 and 8A to 8D, the configuration and control of an air conditioning appliance 200 of a second embodiment will be described. FIG. 7 shows the configuration of the air conditioning appliance 200 of the second embodiment. FIGS. 8A to 8D are figures describing specific examples 1 to 4 using the air conditioning appliance 200, respectively.

As shown in FIG. 7, the air conditioning appliance 200 includes the power supply unit 110, the sensor 120, a first control unit 230, the switching unit 140, the second control unit 150, the operation unit 160, and the device functional unit 170. The first control unit 230 includes a transmission processor 231.

The air conditioning appliance 200 of the second embodiment is different from the air conditioning appliance 100 of the first embodiment with regard to having the first control unit 230 including the transmission processor 231. Since components other than the first control unit 230 are identical to those in the air conditioning appliance 100, descriptions of those are omitted.

The first control unit 230 extracts feature values from the information acquired by the sensor 120. Examples of the feature values include presence of a person inside the room, a position where the person exists, and the person's face temperature, etc. From these feature values, the first control unit 230 can comprehend what control is necessary for the room at the moment, such as to which direction (derived from the position of the person) should the wind be directed, and what temperature should that wind that is to be blown have (derived from the face temperature, etc.), etc. A control content that has been comprehended by the first control unit 230 is outputted to the second control unit 150, and, if necessary, transmitted externally through the transmission processor 231. The transmission processor 231 is formed from, for example, a transmitter configured to radiate wireless radio waves, and a controller configured to control the transmitter, etc.

In the following, the function achieved by the air conditioning appliance 200 of the second embodiment because of the configuration different from that described above will be described by using Examples 1 to 4.

Specific Example 1

Figure 8A:
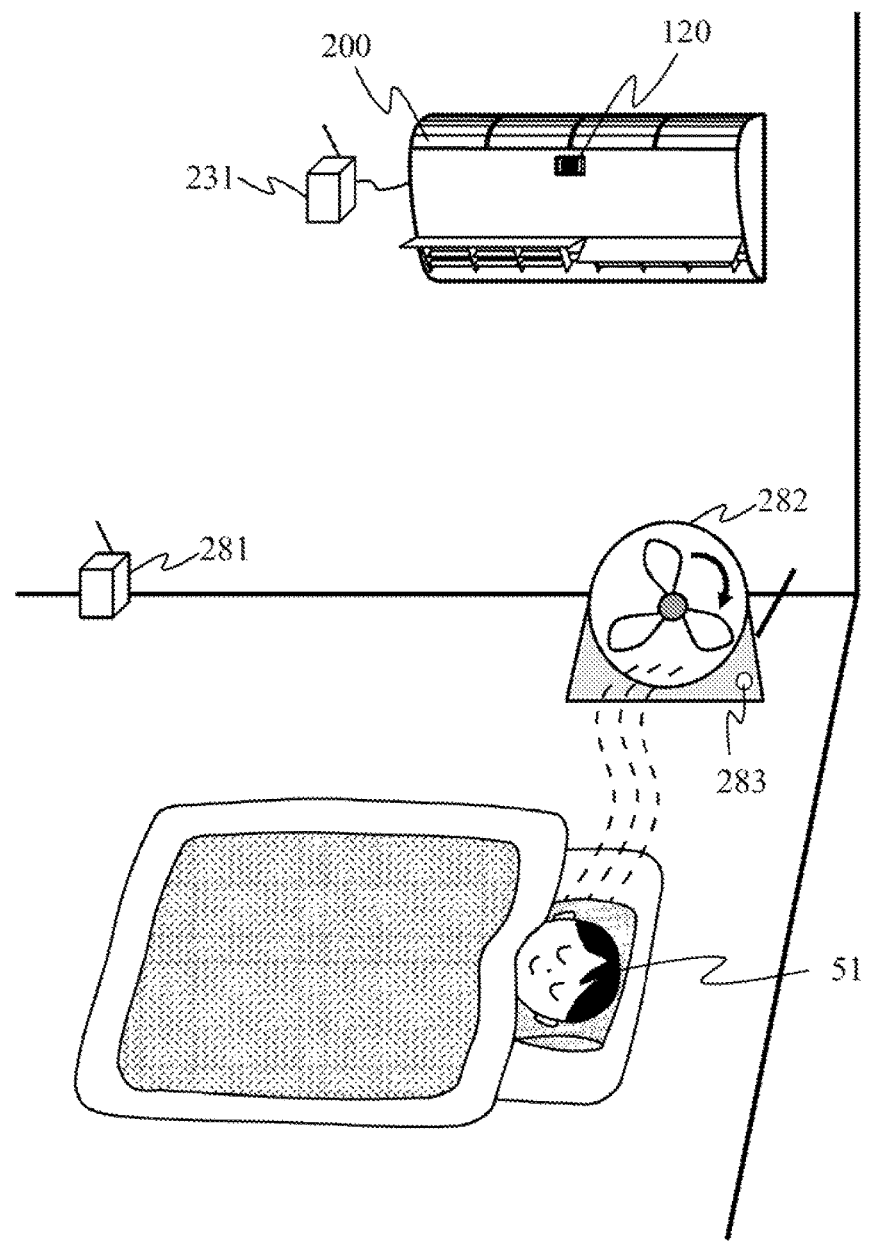
FIG. 8A is for describing a specific example 1 in which the air conditioning appliance 200 is used.

FIG. 8A schematically shows the inside of a room in which the air conditioning appliance 200, a router 281, and a receiver-equipped fan 282 are provided. The receiver-equipped fan 282 has functions of receiving, interpreting, and executing a control signal transmitted from the first control unit 230 of the air conditioning appliance 200 via the transmission processor 231. The control signal is, for example, transmitted and received through the router 281. Furthermore, the receiver-equipped fan 282 has an index functional unit 283 that generates, for notifying its existence, an index signal sensed by the sensor 120 of the air conditioning appliance 200. For example, it is possible to equip the receiver-equipped fan 282 with, as the index functional unit 283, an infrared ray LED that generates infrared rays which can be sensed by the sensor 120, and have the infrared ray LED to flash infrared rays at a predetermined period to be used as the index signal. Alternatively, it is possible to equip the receiver-equipped fan 282 with, as the index functional unit 283, a heating element that generates heat which can be sensed by the sensor 120, and have the heating element to generate heat at a predetermined temperature to be used as the index signal. It is needless to say that components other than the infrared ray LED or the heating element can be used as the index functional unit 283.

In the second embodiment, the sensor 120 can sense not only the environment temperature inside the room, or presence, face temperature, and amount of body movement of the sleeper 51, etc., but also the presence of the receiver-equipped fan 282 based on the index signal. When the receiver-equipped fan 282 is detected, the air conditioning appliance 200 can perform air conditioning together with the receiver-equipped fan 282. More specifically, when the first control unit 230 determines that the receiver-equipped fan 282 should be controlled, the first control unit 230 can transmit a control signal for driving the receiver-equipped fan 282 via the transmission processor 231 and the router 281. In such a case, as the control signal that is to be transmitted, conceivable contents to be transmitted include direction, intensity, and whether to have oscillation, etc., of the wind that is to be generated by the receiver-equipped fan 282. The receiver-equipped fan 282 that has received the control signal will operate with wind having adjusted direction, intensity, and oscillation, etc., based the content of the control signal.

For example, when the face temperature of the sleeper 51 is higher than 35° C. during summer, the sleeper 51 is highly likely to be feeling uncomfortable. This can be predicted from the fact that the temperature of the face during a comfortable sleep in autumn or spring etc., is about 33 to 34° C. On the other hand, the skin temperature other than that of the face during sleep is known to not fluctuate regardless of the season. When the face temperature is higher than 35° C., it is possible to provide a more comfortable sleep by controlling the temperature around the face to be lower by 1 to 2° C. while maintaining the temperature of locations other than the face.

Ordinarily, the air conditioning appliance 200 is often provided at a position about 2 to 3 m away from the sleeper 51, and it is in some cases difficult to apply the wind from the air conditioning appliance 200 only to the face of the sleeper 51. However, as in this specific example, it becomes possible to apply the wind only to around the face of the sleeper 51 through cooperation with the receiver-equipped fan 282. With this, since the temperature of the face of the sleeper 51 can be lowered without lowering the body temperature of the sleeper 51 unnecessarily, an extremely comfortable sleep can be provided.

At this moment, for example, when the environment temperature is not high but only the temperature of the face is high, only the receiver-equipped fan 282 may be operated while keeping the air conditioning appliance 200 shut down. By doing so, an air conditioning with reduced power consumption while maintaining comfort can be attained.

It should be noted that although the receiver-equipped fan 282 has been described as an example of an external device connected to the air conditioning appliance 200, it is needless to say that the external device is not limited thereto, and similar advantageous effects can be obtained as long as the external device has an air conditioning function. Furthermore, even with an external device not having an air conditioning function, advantageous effects as described next can be obtained.

Specific Example 2

Figure 8B:
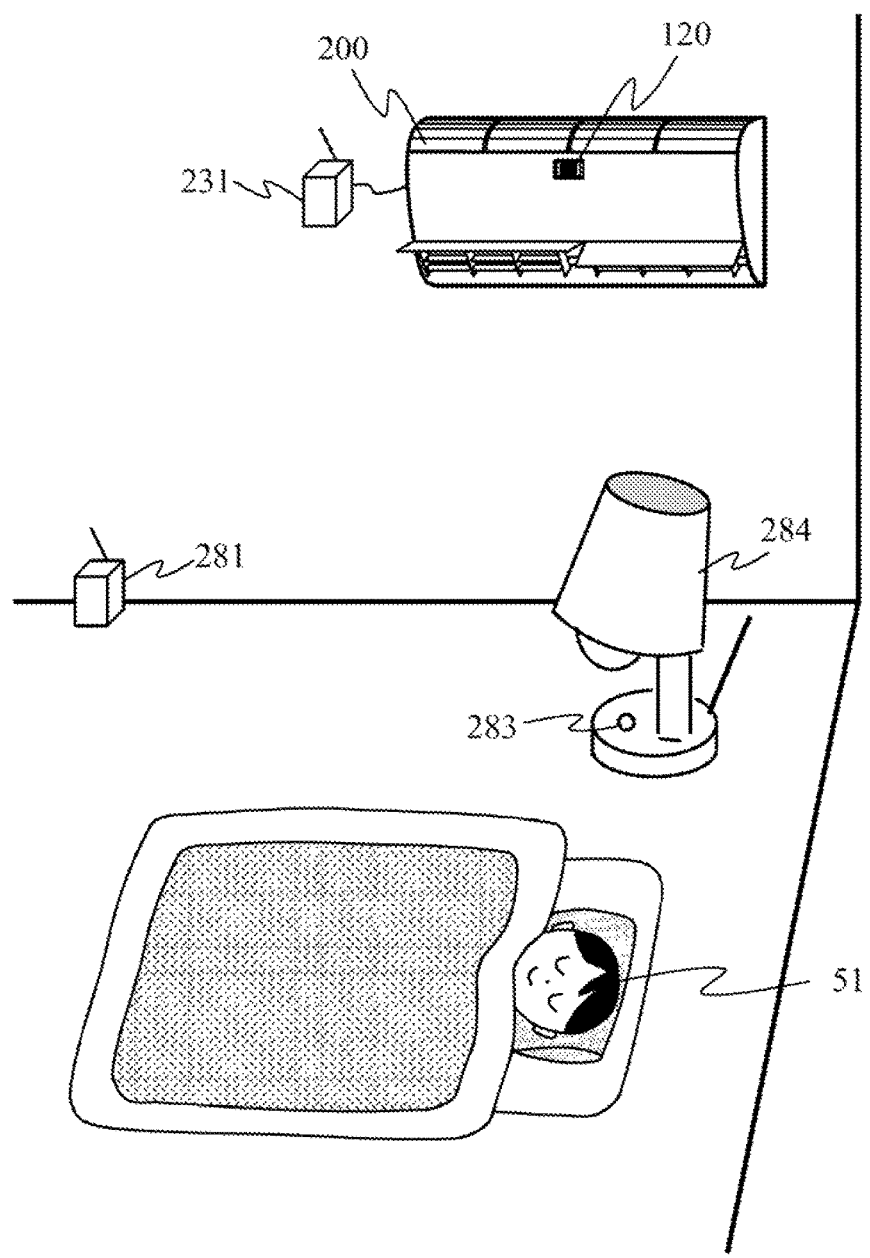
FIG. 8B is for describing a specific example 2 in which the air conditioning appliance 200 is used.

FIG. 8B schematically shows the inside of a room in which the air conditioning appliance 200, the router 281, and a receiver-equipped illumination device 284 are provided. The receiver-equipped illumination device 284 has functions of receiving, interpreting, and executing a control signal transmitted from the first control unit 230 of the air conditioning appliance 200 via the transmission processor 231. The control signal is, for example, transmitted and received through the router 281. Furthermore, similarly to the receiver-equipped fan 282 described above, the receiver-equipped illumination device 284 has the index functional unit 283 that generates, for notifying its existence, an index signal sensed by the sensor 120 of the air conditioning appliance 200.

In the second embodiment, the sensor 120 can sense not only the environment temperature inside the room, or presence, face temperature, and amount of body movement of the sleeper 51, etc., but also the presence of the receiver-equipped illumination device 284 from the index signal. When the receiver-equipped illumination device 284 is detected, the air conditioning appliance 200 can control turning on/off of the illumination device. For example, when the first control unit 230 determines that the sleeper 51 has woken up based on the feature value of the extracted body movement amount etc., the first control unit 230 can transmit a control signal, i.e., light signal, for driving the receiver-equipped illumination device 284 via the transmission processor 231 and the router 281. The receiver-equipped illumination device 284 which has received the light signal can automatically light up the illumination device in accordance with the time at which the sleeper 51 wakes up. With this, it becomes unnecessary for the sleeper 51 to search in the darkness where the switch of the illumination device is located in the room, and thereby convenience is improved.

In this specific example, although a case has been described in which the illumination device of the room is controlled, illumination devices in the living room, hallway, and toilet may be controlled. Furthermore, it is also conceivable to control the air-conditioning and the toilet seat temperature of the toilet.

Furthermore, in this specific example, although a case in which the control has been performed after the detection of the amount of body movement of the sleeper 51 has been described, the control may be performed through other methods. For example, the body temperature during sleep ordinarily has a rhythm in which the temperature gradually reduces starting from the sleep onset stage and then increases 1 to 2 hours before waking up. In addition, the amount of body movement during sleep is known to increase before wake-up when compared to the sleep onset stage. Thus, the body temperature information and the body movement information may be extracted by the first control unit 230, and wake-up time may be assumed therefrom. In that case, it is possible to encourage a gradual wake-up by increasing the brightness of the receiver-equipped illumination device 284 little by little before the assumed wake-up time.

Other than that, it is also possible to have the receiver-equipped illumination device 284 cooperate based on a gesture of the sleeper 51. For example, when a gesture of greatly stretching an arm is set in advance to the first control unit 230 as a cue for turning on/off the receiver-equipped illumination device 284, the sleeper 51 can light up the room by greatly stretching an arm without searching for the illumination device when the room is dark. It is needless to say that this gesture is merely one example and the means is not limited thereto, such as, for example, both hands may be used, or bending and extending of the arm may be used.

Furthermore, when the sleeper 51 is a small child, a local decrease in temperature in a short period of time will be observed upon bed wetting. When such event is detected by the first control unit 230, the receiver-equipped illumination device 284 may be lit to encourage the sleeper 51 to wake up for preventing a decrease in body temperature and preventing the sleeper 51 from catching a cold due to continue sleeping in such state. It is needless to say that preventing a decrease in body temperature and preventing the sleeper 51 from catching a cold may be performed by increasing temperature of the wind from the air conditioning appliance 200. In addition, when the receiver-equipped illumination device is also provided in the bedroom of the parents, the parents may be notified about the bed wetting by the sleeper 51 by lighting up the illumination device. Alternatively, when a receiver-equipped alarm which is not show is provided in the bedroom of the parents, the parents may be notified about the bed wetting by the sleeper 51 by sounding the alarm. By doing so, proper care of the sleeper 51 who is a child of the parents can be encouraged, and an advantageous effect of preventing a decrease in body temperature of the sleeper 51 and preventing the sleeper 51 from catching a cold can be obtained.

Specific Example 3

Figure 8C:
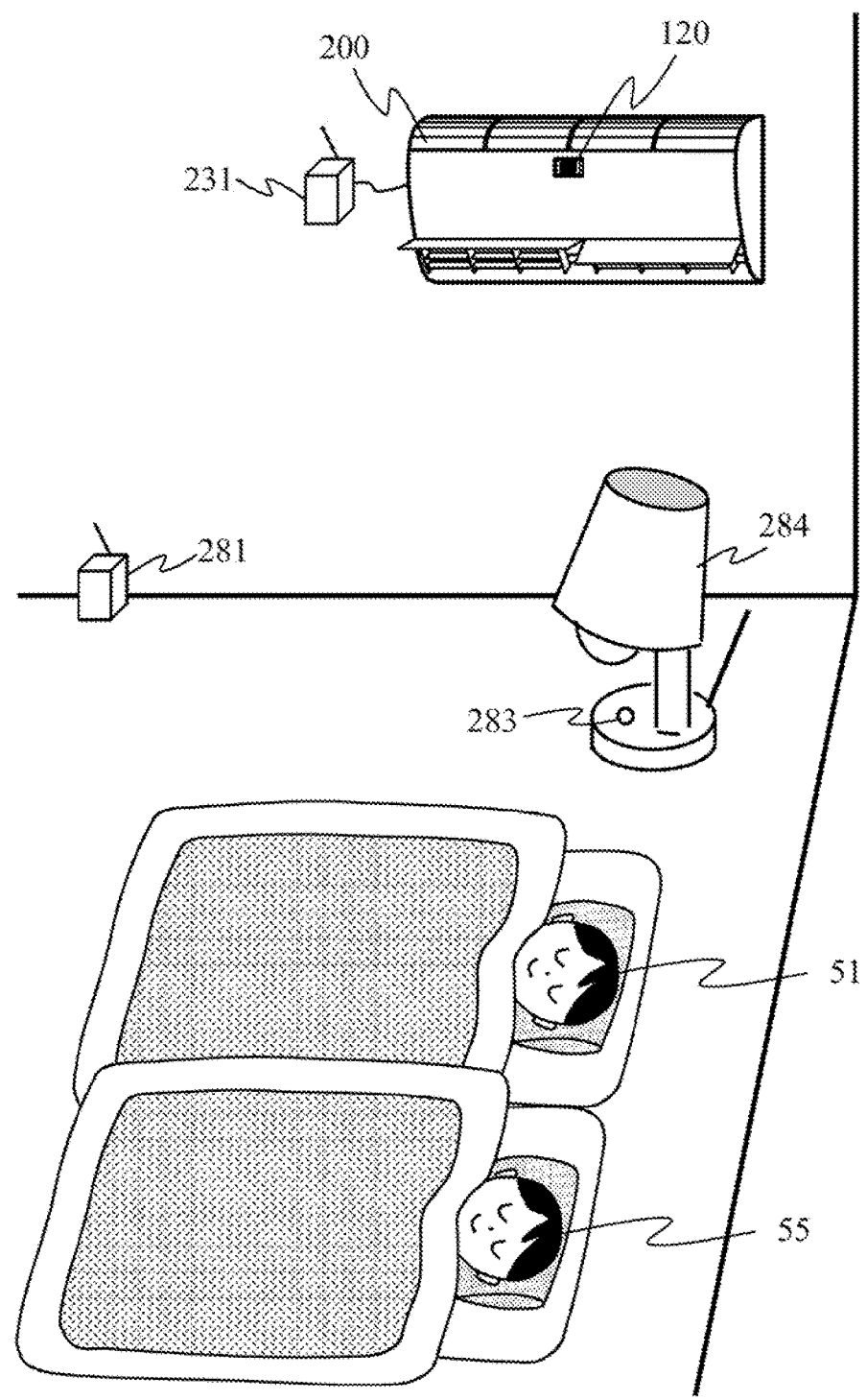
FIG. 8C is for describing a specific example 3 in which the air conditioning appliance 200 is used.

Similar to FIG. 8B, FIG. 8C schematically shows the inside of a room in which the air conditioning appliance 200, the router 281, and the receiver-equipped illumination device 284 are provided, except that two people, the sleeper 51 and a sleeper 55, exist in the room. In this case, the first control unit 230 detects the presence of two sleepers based on an image obtained by the sensor 120. In this case, for example, when the sleeper 51 wakes up, the first control unit 230 can understand that the sleeper 51 has woken up but the sleeper 55 is still asleep. Thus, by setting the first control unit 230 to light up the receiver-equipped illumination device 284 with reduced brightness using a transmitted signal, and advantageous effect of ensuring convenience of the sleeper 51 without disturbing the sleep of the sleeper 55 can be obtained.

Furthermore, for example, the receiver-equipped illumination device 284 may be dimly lit during onset of sleep determined from the amount of body movement extracted by the first control unit 230, and, for example, the receiver-equipped illumination device 284 may be turned off when reaching of a deep sleep is determined based similarly on a reduction of the amount of body movement extracted by the first control unit 230. For example, it is understood that a sleep becomes shallow when a child sleeps through the night with a dim-light turned on because of being frightened, etc. By performing the above described control, since the dim-light can be turned on at the sleep onset and turned off when a deep sleep is achieved, a deeper sleep can be obtained. Obviously, as described above, since the illumination device is automatically lit upon wake up, the room will not be dark upon wake up (and the child will not be afraid of being in the dark).

In this case, the control of brightness of the illumination device may be determined by the first control unit 230 of the air conditioning appliance 200, or the amount of body movement extracted by the first control unit 230 may be received by the receiver-equipped illumination device 284 and the brightness may be determined inside the receiver-equipped illumination device 284. It is needless to say that other control methods may be used, and the method is not limited.

Specific Example 4

Figure 8D:
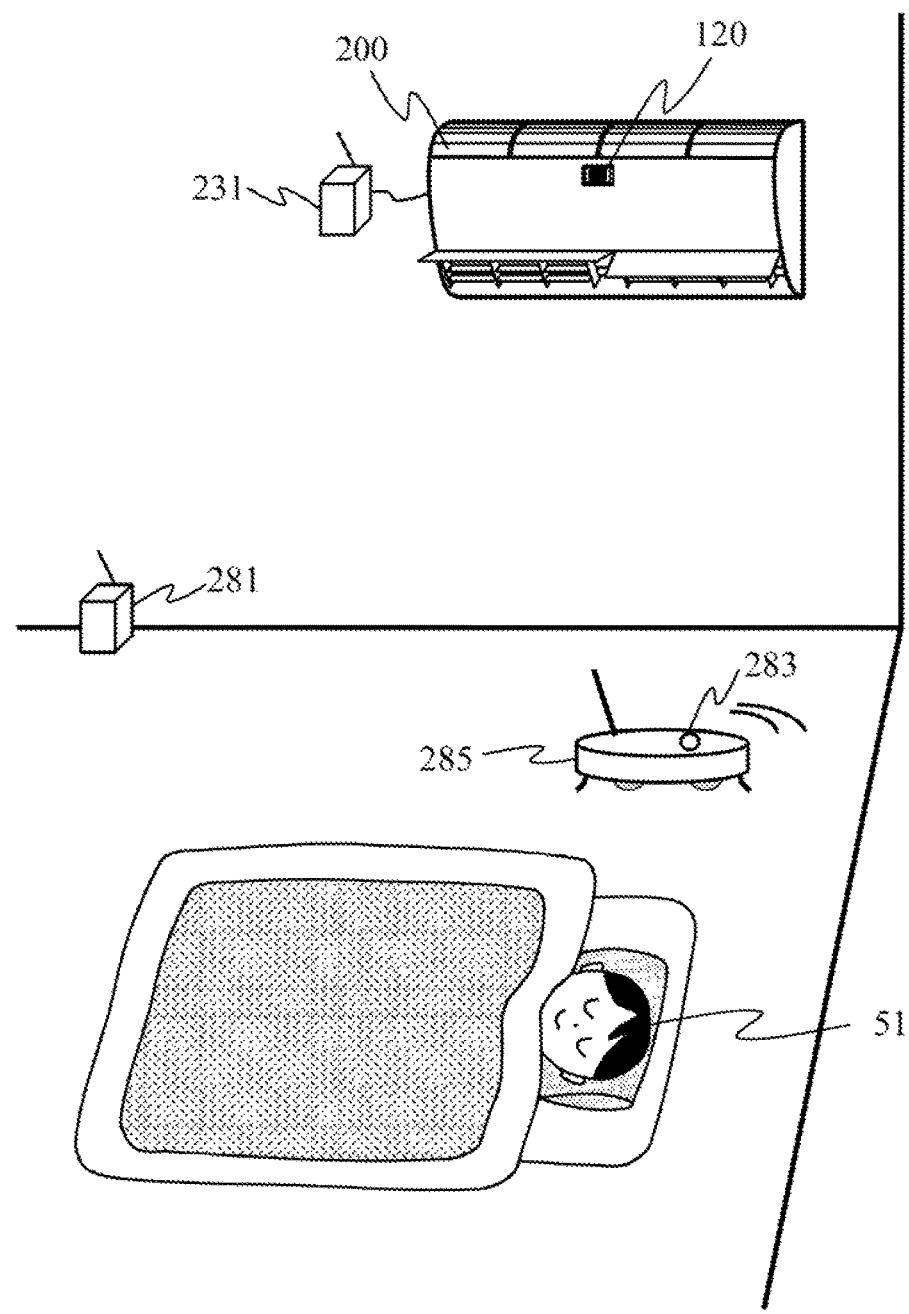
FIG. 8D is for describing a specific example 4 in which the air conditioning appliance 200 is used.

FIG. 8D schematically shows the inside of a room in which the air conditioning appliance 200, the router 281, and a receiver-equipped vacuum cleaner 285 are provided. The receiver-equipped vacuum cleaner 285 has functions of receiving, interpreting, and executing a control signal transmitted from the first control unit 230 of the air conditioning appliance 200 via the transmission processor 231. The control signal is, for example, transmitted and received through the router 281. Furthermore, similarly to the receiver-equipped fan 282 described above, the receiver-equipped vacuum cleaner 285 has the index functional unit 283 that generates, for notifying its existence, an index signal sensed by the sensor 120 of the air conditioning appliance 200.

In the second embodiment, the sensor 120 can sense not only the environment temperature inside the room, or presence, face temperature, and amount of body movement of the sleeper 51, etc., but also the presence of the receiver-equipped vacuum cleaner 285 based on the index signal. When the receiver-equipped vacuum cleaner 285 is detected, the air conditioning appliance 200 can control operation/shutdown of the vacuum cleaner. For example, when the first control unit 230 determines that the sleeper 51 has fallen asleep based on feature values such as the amount of body movement that has been extracted, the first control unit 230 can transmit a control signal for driving the receiver-equipped vacuum cleaner 285, i.e., a startup signal, via the transmission processor 231 and the router 281. The receiver-equipped vacuum cleaner 285 that has received the startup signal can start cleaning in coordination with the sleep timing of the sleeper 51. As a result, cleaning of the room can be performed while the sleeper 51 is asleep, and thereby convenience is improved.

In addition, the position of the sleeper 51 can be detected from the temperature distribution sensed by the sensor 120, and the first control unit 230 can specify the range that should be cleaned by the receiver-equipped vacuum cleaner 285 based on the detected positional information of the sleeper 51. Furthermore, the depth of the sleep can be estimated from body movement etc., and operation of the receiver-equipped vacuum cleaner 285 may be controlled based on the estimated sleep depth. For example, by operating the receiver-equipped vacuum cleaner 285 when the sleep depth became large, an advantageous effect of being able to clean the room without obstructing the sleep of the sleeper 51 can be obtained. Furthermore, instead of the room in which the sleeper 51 is sleeping, a receiver-equipped vacuum cleaner placed in another room may be controlled.

It should be noted that, in the above described specific examples, examples have been described in which the control signal transmitted by the first control unit 230 via the transmission processor 231 is received by the receiver-equipped fan 282, the receiver-equipped illumination device 284, or the receiver-equipped vacuum cleaner 285 via the router 281. However, the reception of the control signal may be directly performed by the transmission processor 231 without going through the router 281. It is needless to say that the connection may be wired or wireless. In addition, other than the receiver-equipped fan 282, the receiver-equipped illumination device 284, and the receiver-equipped vacuum cleaner 285; various devices having a receiver can be used as the object that is controlled by the air conditioning appliance 200. For example, a fire alarm or the like may be linked, and in such a case, when the sensor 120 senses an abnormally high temperature, a fire alarm is conceivably sounded. By doing so, detection capability of the fire alarm can be further improved.

Furthermore, the object that is to be controlled by the air conditioning appliance 200 is not limited to a device that is in the same room. For example, the router 281 that may be connected to the Internet, and data uploaded to a server may be used for controlling the air conditioning appliance 200 and the receiver-equipped fan 282, etc. For example, such data may be used for controlling other devices or other use applications such as statistical survey and malfunction prediction, etc. When a refrigerator is the object, a conceivable control is to moderate operation of a compressor of the refrigerator when the sleeper 51 is detected to be asleep. By doing so, the sound of the refrigerator becomes quiet, and thereby the sleeper 51 can obtain a deeper sleep.

[Handling of Sensing Data]

Next, by using FIG. 9, handling of data (acquired information) measured by the sensor 120 will be described.

Figure 9:
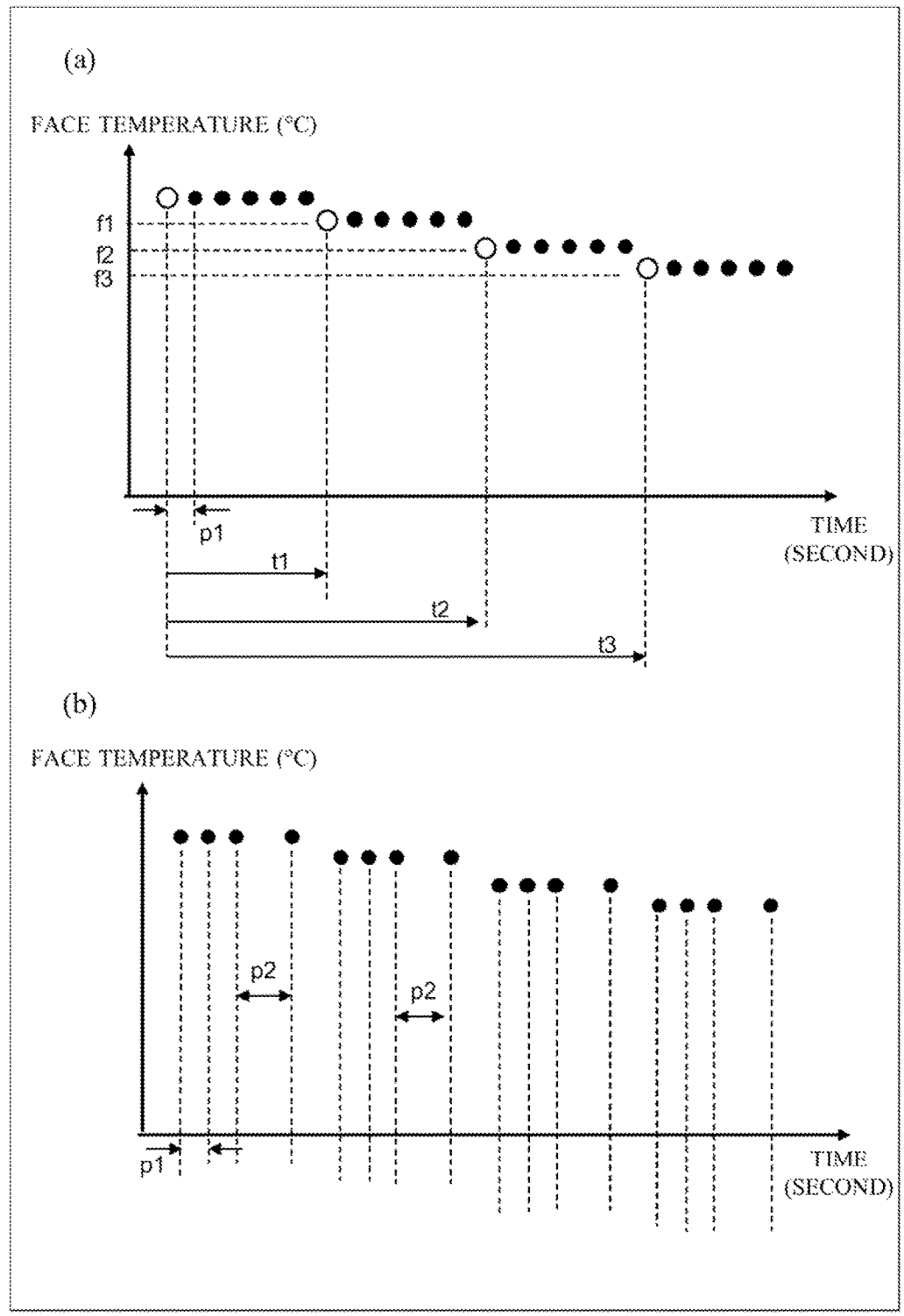
FIG. 9 is for describing an example how data measured by a sensor 120 is handled.

FIG. 9 shows one example of the change in face temperature of the sleeper 51, which is data measured by the sensor 120 and extracted by the first control unit 230. In FIG. 9, the horizontal axis represents time and the vertical axis represents face temperature.

In (a) of FIG. 9, it can be understood that the time interval for the measurement by the sensor 120 is defined as p1 (second), and face temperature is plotted every p1 (second). In this case, the face temperature is extracted by the first control unit 230 based on information obtained from the sensor 120 every p1 (second), and a control signal is transmitted from the transmission processor 231 every p1 (second). Generally at this point, although the body temperature during sleep is known to gradually decrease from the beginning of the sleep to morning, large fluctuation is not observed so much. Thus, most of the control signal transmitted during sleep has a high possibility of being a control signal with the same data.

Thus, for example, when the control signal is not received on the receiver-equipped fan 282 side after p1 (second) has elapsed, a configuration is used in which the control is performed using an immediately preceding control signal. By configuring the receiver-equipped fan 282 in such manner, the first control unit 230 can stop transmitting the control signal when the face temperature extracted by the sensor 120 and the first control unit 230 is the same face temperature obtained p1 (second) earlier.

By doing so, it becomes unnecessary to transmit the control signal from the transmission processor 231 excessively, and an advantageous effect is obtained of being able to reduce power consumption for the driving of the transmission processor 231, reception and transmission at the router 281, and reception of the control signal by the receiver-equipped fan 282, etc.

In the example in (a) of FIG. 9, the timings at which the control signal is actually transmitted from the transmission processor 231 of the air conditioning appliance 200 are, as shown with circle marks, the timing at the beginning of measurement, t1 seconds later when the face temperature has changed to f1 (° C.), t2 seconds later when the face temperature has changed to f2 (° C.), and t3 seconds later when the face temperature has changed to f3 (° C.).

In addition, in the example in (b) of FIG. 9, although the face temperature is extracted every p1 (second) at the beginning of the measurement, when the face temperature extracted at the time interval of p1 (second) is the same temperature continuously for two times, the time interval of the measurement by the sensor 120 is changed from p1 (second) to a longer p2 (second) and the face temperature is extracted.

For example, when the control signal is not received on the receiver-equipped fan 282 side after p1 (second) has elapsed, a configuration is used in which the control is performed using an immediately preceding control signal. By configuring the receiver-equipped fan 282 in such manner, the first control unit 230 can prolong (cull) the interval of the control signal when the several face temperatures extracted by the sensor 120 and the first control unit 230 at an interval of p1 (second) are continuously identical. With this, the number of control signals excessively transmitted from the transmission processor 231 is reduced, and an advantageous effect is obtained of being able to reduce power consumption for the driving of the transmission processor 231, reception and transmission at the router 281, and reception of the control signal by the receiver-equipped fan 282, etc.

In (b) of FIG. 9, the interval of measurement by the sensor 120 is described to be changed from p1 (second) to p2 (second). However, it is needless to say that, instead of changing the interval of measurement by the sensor 120, the timing for extracting the face temperature by the first control unit 230 may be changed to p2 (second), or the timing for transmitting the control signal from the transmission processor 231 may be changed to p2 (second), and the means is not limited. Furthermore, the method of (a) in FIG. 9 and the method of (b) in FIG. 9 may be combined.

In the present embodiment, although the temperature of the face during sleep has been described as an example, it is needless to say that a similar control may be performed at the time of arousal or using other parts of the body, and a similar advantageous effect can be obtained in response to the change in body temperature fluctuation.

Third Embodiment

In the first and second embodiments described above, the air conditioning appliances 100 and 200 each equipped with the thermal image sensor have been described using events related to sleep as an example. Described in a third embodiment is specifically how a more comfortable sleep is obtained with what kind of control using the air conditioning appliances 100 and 200 each equipped with the thermal image sensor.

First, by using FIG. 10, general physiological phenomena of a person during sleep will be described.

Figure 10:
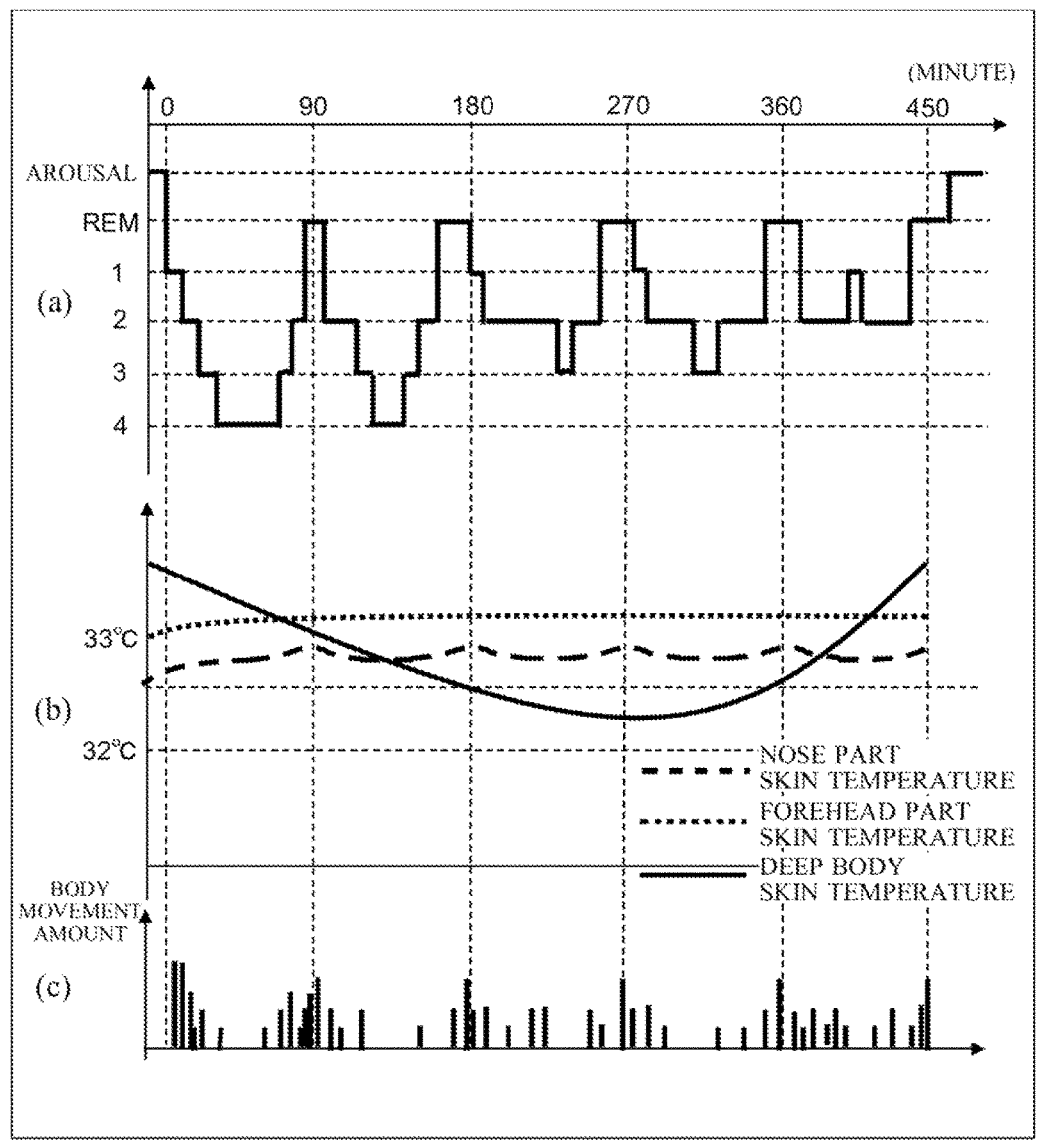
FIG. 10 is for describing general physiological phenomena of a person during sleep.

In FIG. 10, (a) shows the depth of sleep over time, (b) shows body temperature and body surface temperature over time during sleep, and (c) shows body movement amount over time. It should be noted that data shown in FIG. 10 is one example of a representative person, and these waveforms may differ depending on personal differences and surrounding environment, etc.

The depth of sleep will be described using (a) of FIG. 10.

Sleep is classified into two types, REM (Rapid Eye Movement) sleep during which the eyeballs rapidly move and non REM sleep not accompanied with the movement of the eyeballs. The non REM sleep is divided into stages 1 to 4 depending on the depth of sleep. Sleep is the deepest in sleep stage 4 and the brain is also asleep, whereas, in the REM sleep, it is said that although the body is asleep the brain is active. As shown in (a) of FIG. 10, the REM sleep and the non REM sleep appear alternately during sleep. The non REM sleep appears immediately after sleep onset, and the REM sleep appears next. It is said that this cycle generally appears approximately every 90 minutes for normally 4 to 5 times overnight. This cycle of approximately 90 minutes is also referred to as an ultradian rhythm.

Furthermore, as shown in (c) of FIG. 10, the body movement amount during sleep generally is unlikely to occur when the sleep is deep, and occurs at high frequency when the sleep depth is shallow and during the stage of the REM sleep.

Next, the fluctuation of body surface temperature during sleep will be described using (b) of FIG. 10.

Since the metabolism level falls during sleep, the deep body temperature (solid line) tends to decrease before sleep, generally decreases from middle stage to late stage of sleep to reach the minimum body temperature, and then increases toward arousal. Furthermore, the forehead part skin temperature (dotted line) is relatively close to the deep body temperature although being a body surface temperature, is unlikely to be affected by the environmental temperature, and tends to show almost a constant temperature during sleep subsequent to settling down to a steady state. On the other hand, the nose part skin temperature (dashed line) corresponds to that of a peripheral part and is easily affected by the environmental temperature. In addition, since the activity of the autonomic nervous system generally becomes unstable during the REM sleep, the skin temperature of peripheral parts are said to be easily affected by the environmental temperature. As the nose part skin temperature shown in (b) of FIG. 10, the body surface temperature is known to fluctuate in some case during and around the REM sleep because of the environmental temperature. Furthermore, mid-sleep arousal of temporarily waking up during sleep is said to occur at high frequency during REM sleep and at timings before and after that in which the sleep is relatively shallow in a sleep depth of about 1 to 2. It is thought that comfortably maintaining the room environment during this period leads to reduced frequency of mid-sleep arousal and consequently to promotion of comfortable sleep.

Generally, when a person is feeling cold, it is thought that blood flow toward peripheral parts is suppressed to prevent a decrease of the deep body temperature. When the peripheral skin temperature is reduced to a predetermined temperature with respect to the deep body temperature, the person can be presumed to be feeling cold. Furthermore, the opposite happens when a person is feeling hot in which diffusion of heat inside of the body is promoted by increasing the amount of blood flow toward the peripheral parts, resulting in a relative increase in peripheral skin temperature compared to when it is cold. Thus, by monitoring the peripheral skin temperature such as the nose part skin temperature, the thermal sensation of a person can be estimated. In addition, by adjusting the environmental temperature using an air conditioning appliance or the like such that the peripheral skin temperature falls within a predetermined temperature range, it is thought that a comfortable sleep environment can be maintained constantly. On the other hand, as shown in (b) of FIG. 10, since the body surface temperature is easily affected by the environmental temperature during the REM sleep, when the environment temperature is adjusted by the air conditioning appliance at this timing such that fluctuation of the temperature of the body surface corresponding to peripheral parts such as the nose part is reduced, it is thought that the frequency of mid-sleep arousal can be reduced and a further comfortable sleep environment can be provided.

It should be noted that although the nose part skin temperature has been shown as an example of the peripheral skin temperature, it is needless to say that the part where the measurement is performed is not limited thereto, and other parts such as the cheek, the back of the hand, the palm part of the hand, etc., may be used.

Figure 11:
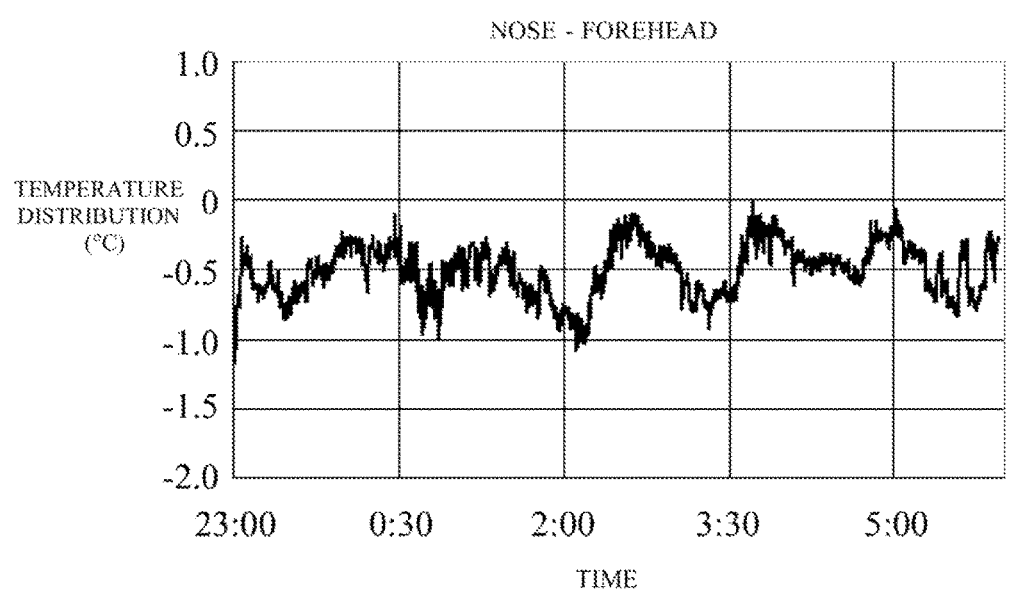
FIG. 11 shows one example of estimating the thermal sensation of a person.

As the deep body temperature may vary from person to person, personal difference in the skin temperature of a peripheral part is also observed depending on the person. It is conceivable that a further comfortable sleep environment with small personal difference can be provided by calculating the difference between the peripheral skin temperature and the forehead part skin temperature that is close the deep body temperature, and adjusting the environmental temperature such that this value is equal to or lower than a predetermined temperature. As one example, FIG. 11 shows a graph obtained by subtracting the forehead part skin temperature from the nose part skin temperature. As described above, it can be understood that the difference in temperature between the nose part and the forehead part increases as the sleep becomes shallow, and reaches a peak around the REM sleep timing. By adjusting the environment temperature using the air conditioning appliance such that this periodical body temperature fluctuation becomes small, it is thought that the frequency of mid-sleep arousal can be reduced and a further comfortable sleep environment can be provided.

Figure 12:
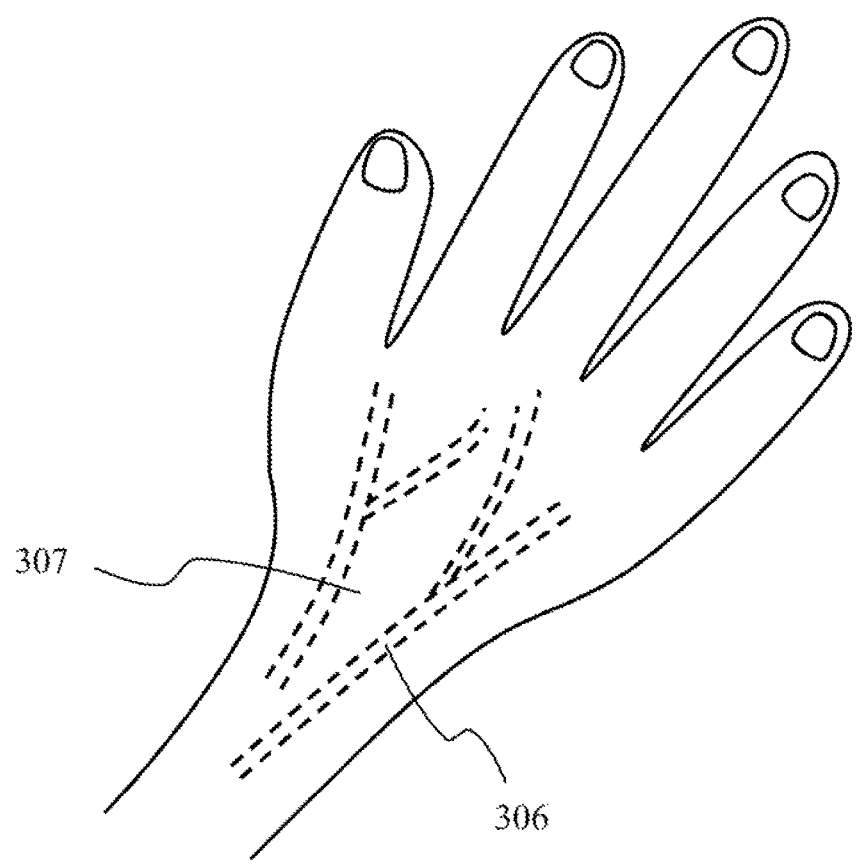
FIG. 12 shows another one example of estimating the thermal sensation of a person.

Furthermore, although the forehead part has been used as a part whose temperature is close to the deep body temperature in the description above, other parts may be used as long as it is a part reflecting the deep body temperature, and, for example, a vascular part may be used. For example, thermal sensation can be estimated by comparing a vascular part and a nonvascular part. For example, as shown in FIG. 12, the temperatures of a vascular part 306 of a hand and a nonvascular part 307 proximal thereto may be measured and a difference therebetween may be calculated. By doing so, since the personal difference can be reduced and thermal sensation can be estimated from the temperature of proximal parts, an advantageous effect of being able to perform the measurement simply can be obtained.

Next, one example of a method for measuring the skin temperature of the body during sleep will be described.

Figure 13:
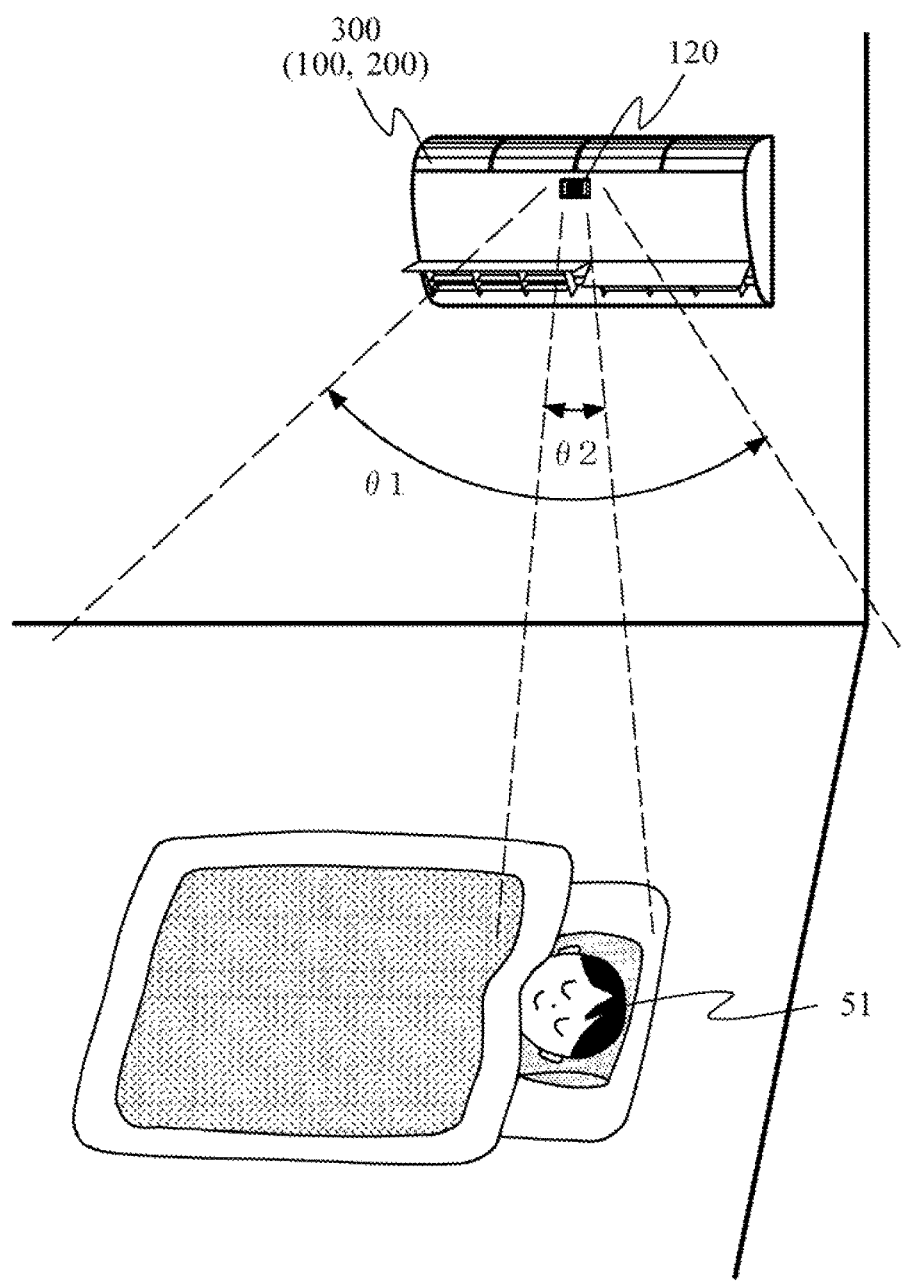
FIG. 13 is for describing a specific example in which an air conditioning appliance 300 according to a third embodiment is used.
Figure 14:
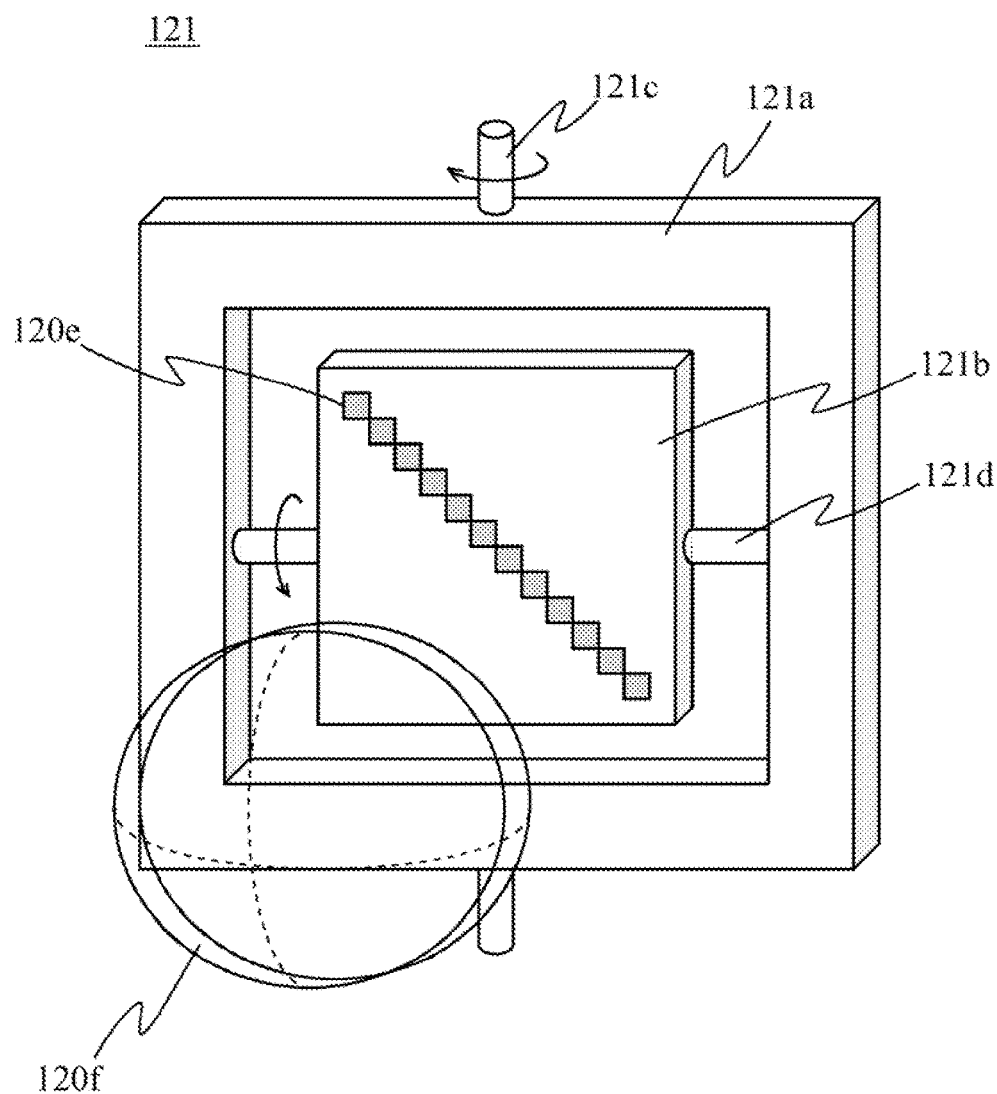
FIG. 14 is for describing a configuration example of a temperature sensor 121.

FIG. 13 is a schematic diagram showing how the skin temperature of the sleeper 51 is measured using the sensor 120 installed in an air conditioning appliance 300 of the third embodiment. The sensor 120 may be, for example, a temperature sensor 121 shown in FIG. 14. The temperature sensor 121 shown in FIG. 14 includes an infrared detection element array 121b having disposed thereon infrared detection elements 121e, a shaft 121d that holds the infrared detection element array 121b, a substrate 121a that holds the shaft 121d, a lens 121f for forming a thermal image on the infrared detection elements 121e, and a shaft 121c. The shaft 121c allows rotation in the right-left direction with respect to the paper surface, and the shaft 121d allows rotation in the up-down direction with respect to the paper surface. The lens 121f is fixed with respect to the infrared detection element array 121b by a member that is not shown. In this state, by rotating the shaft 121c and the shaft 121d, thermal image from a wide range from up, down, right, and left directions can be formed.

Here, for the lens 121f, germanium, silicon, or the like that allows penetration of far-infrared rays is generally used for forming the far-infrared rays into an image. However, the material of the lens 121f is not limited thereto as long as it is a glass material that allows penetration of far-infrared rays, and, if a resin material is to be used, high-density polyethylene or the like may be used. By using the temperature sensor 121 that can scan a wide angle as described above and by widely scanning the room at the beginning of operation using an angle θ1 as shown in FIG. 13, the position where a person exist can be detected. In (a) of FIG. 15, one example of an image obtained at this moment is shown. Generally, the skin temperature of a human is, for example, about 33° C. near the forehead, and is ordinarily higher than the environment temperature during sleep. Thus, by detecting a high temperature part, the position of the sleeper can be ascertained, and by tracing the motion thereof at the moment it has entered the room, it is possible to distinguish that from other heating elements such as a television or the like that is stationary. At this moment, when a single pixel is formed from, for example, multiple infrared detection elements 121e, the temperature sensor 121 can scan at a high rate due to having improved sensitivity per pixel that is formed, and the position of the sleeper 51 can be rapidly detected.

When the position of the face of the sleeper 51 is detected from the image obtained from scanning at the angle θ1, the temperature around the face of the sleeper 51 is sensed in detail next. In this sensing, detailed temperature around the face of the sleeper 51 is sensed by narrowly scanning the room with an angle θ2 as shown in FIG. 13. One example of a thermal image around the face is shown in (b) of FIG. 15. Generally, among the skin temperatures of the face, the temperature at the forehead is the highest, and the temperature at the nose or cheek is the lowest. Thus, for example, the position of the face may be extracted and cut out, and within the temperatures of the central part, the location (A2 in the figure) having the lowest temperature may be detected as the nose part and the location (A1 in the figure) having the highest temperature may be detected as the forehead part. In addition, for example, the location of the cheek part may be identified based on the contour of the face and the location of the forehead. In such manner, the forehead part temperature, the nose part temperature, and the cheek part temperature, etc., of the sleeper 51 can be sensed.

It should be noted that the method described here is merely one example for measuring the temperature of the body surface of the sleeper 51, and other methods may be used. For example, the sensor 120 may be a temperature sensor 122 shown in FIG. 16. The temperature sensor 122 includes a substrate 122a, an infrared detection element array 122b on which infrared detection elements 122e are arranged in a two-dimensional matrix, and a lens 122f and a lens 122g forming a zoom lens 122h. The infrared detection element array 122b is attached to the substrate 122a, and the zoom lens 122h is held on the substrate 122a by a member that is not shown. The lenses 122f and 122g can slide parallelly with respect to an optical axis by a mechanical component that is not shown. In such a configuration, by adjusting the positional relationship between the lens 112f and the lens 112g, both a wide angle image and a telescopic image can be captured. For example, by adjusting the positional relationship between the lens 122f and the lens 122g, a wide angle image as shown in (a) of FIG. 15 can be captured. Furthermore, by attaching a shaft 122c and a shaft 122d to the temperature sensor 122 in a manner similar to the temperature sensor 121, a telescopic image at any position can be acquired. Thus, at the beginning, the positional relationship between the lens 122f and the lens 122g can be adjusted to capture a wide angle image as shown in (a) of FIG. 15, and the position of the face can be extracted from the captured image. Then, the positional relationship between the lens 122f and the lens 122g can be adjusted while being directed toward the position of the extracted face through rotation of the shaft 122c and the shaft 122d to capture an image of the temperature distribution of the face with high resolution as shown in (b) of FIG. 15.

Figure 15:
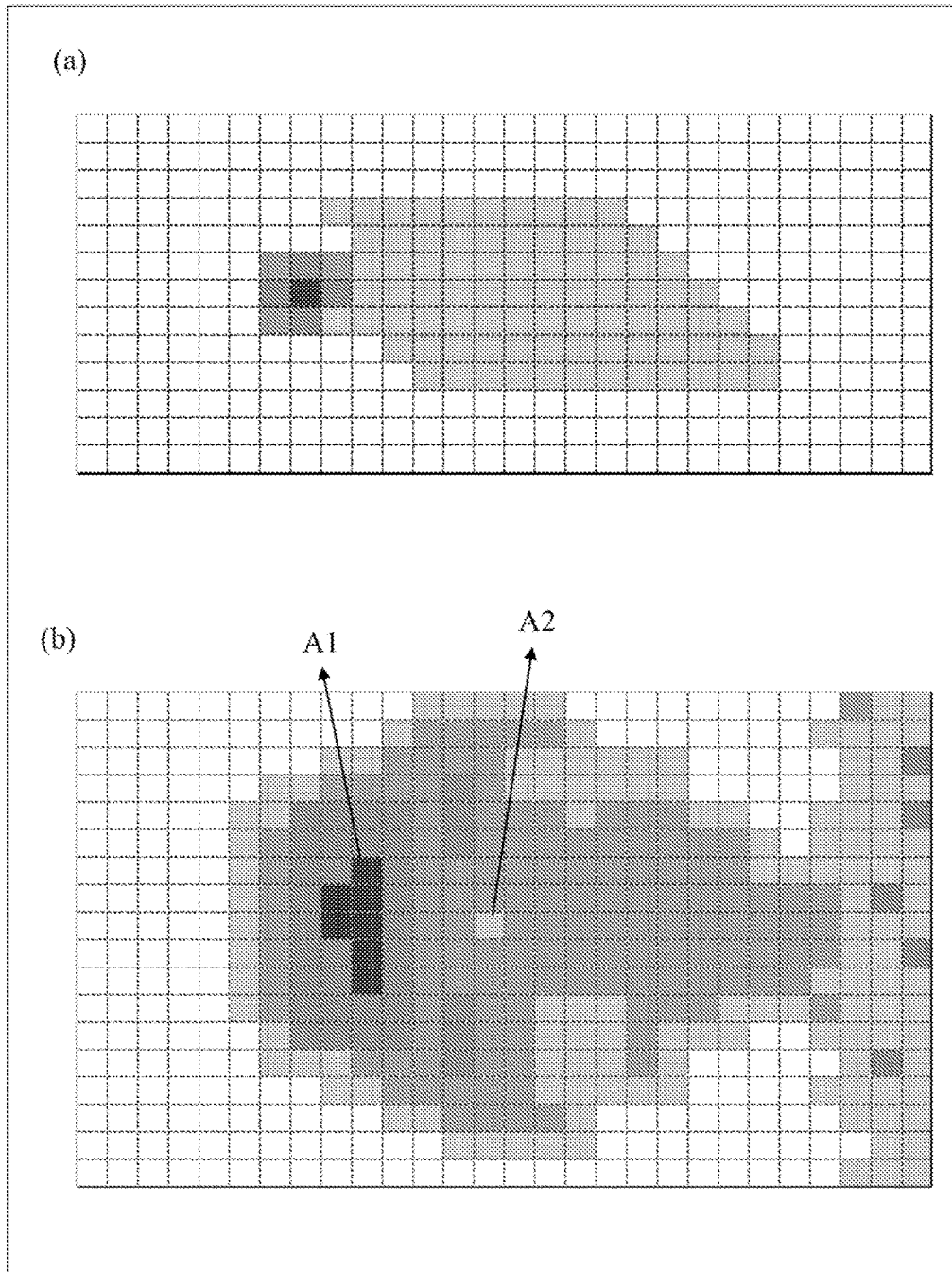
FIG. 15 shows one example of data acquired by the temperature sensor 121.
Figure 16:
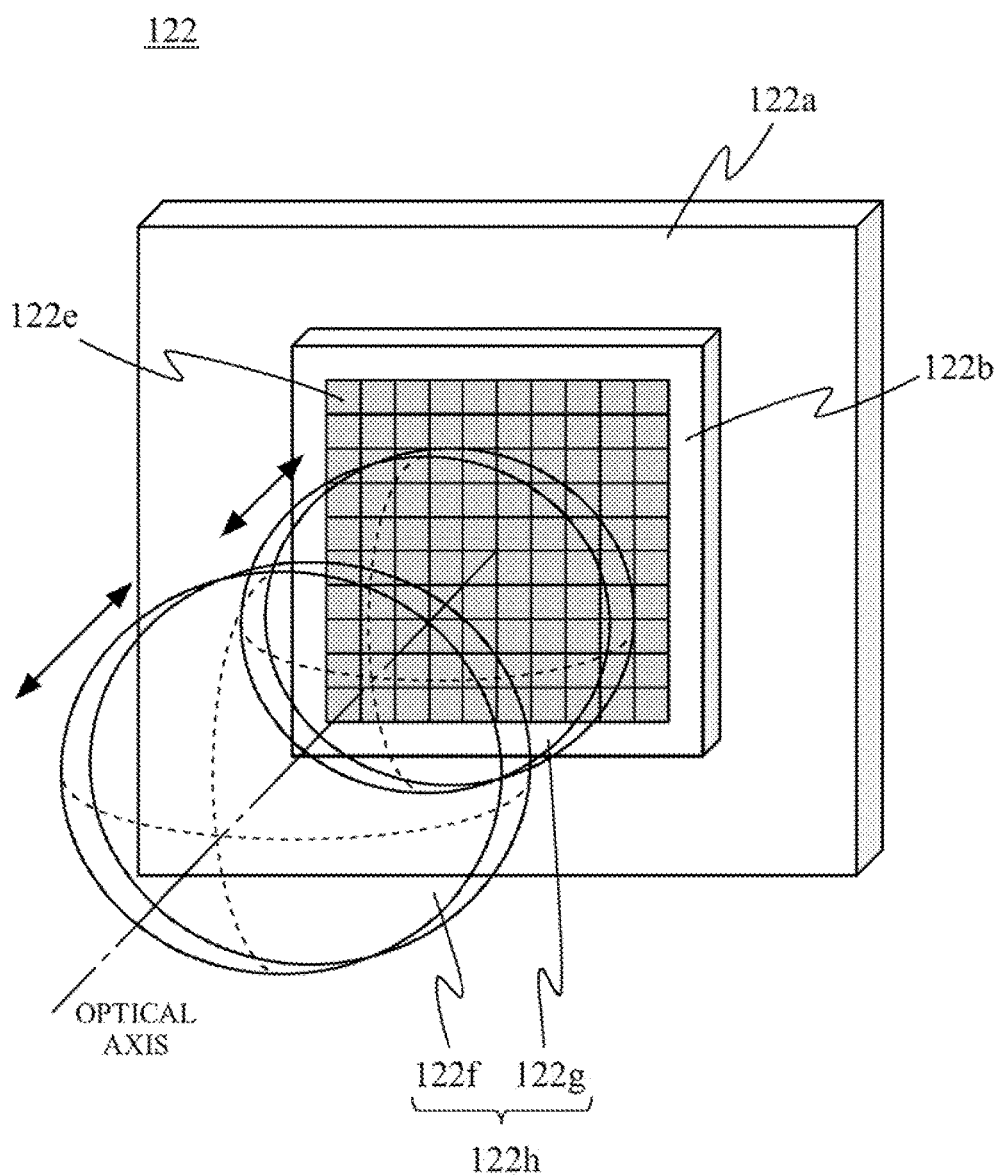
FIG. 16 is for describing a configuration example of a temperature sensor 122.

It should be noted that although the number of pixels in the infrared detection element array 122b in FIG. 16 is 10 pixels×10 pixels, this is merely one example and the number of pixels can be set to any number. In addition, the image shown in FIG. 15 is merely one example, and does not represent the number of pixels of the infrared detection elements of the temperature sensors 121 and 122.

Figure 17:
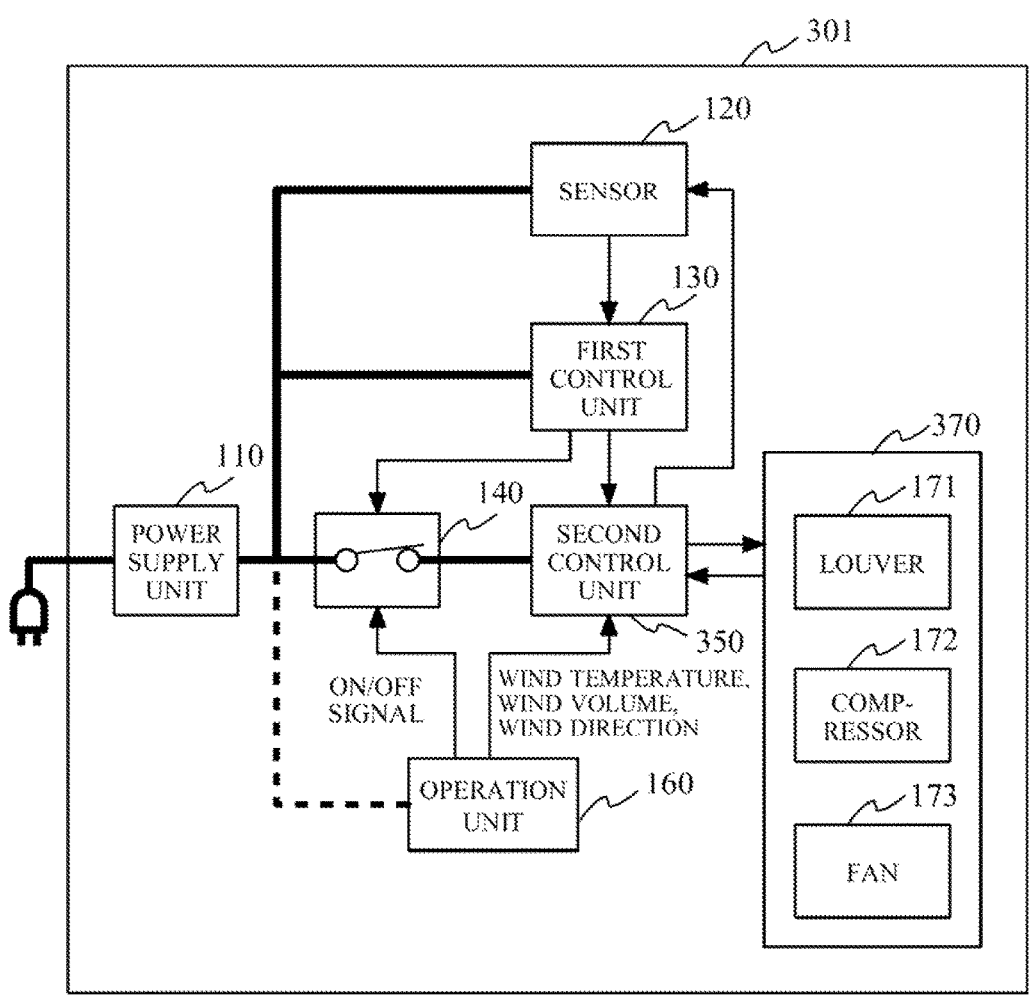
FIG. 17 shows the configuration of another air conditioning appliance 301 according to the third embodiment.

Next, in order to sense the fluctuation of the skin temperature, the skin temperature has to be sensed with higher accuracy. The method for that will be described using FIGS. 17 to 19. FIG. 17 shows an air conditioning appliance 301 of the third embodiment obtained by further adding improvements to the air conditioning appliances 100 and 200 for sensing the skin temperature with high accuracy.

As shown in FIG. 17, the air conditioning appliance 301 includes the power supply unit 110, the sensor 120, the first control unit 130, the switching unit 140, a second control unit 350, the operation unit 160, and a device functional unit 370. The air conditioning appliance 301 of the third embodiment is different from the air conditioning appliance 100 of the first embodiment since the second control unit 350 and the device functional unit 370 each performs a characteristic control. Since components other than the second control unit 350 and the device functional unit 370 are identical to those in the air conditioning appliance 100, descriptions of those are omitted.

The device functional unit 370 provides a feedback to the second control unit 350 regarding the state of the louver 171. Specifically, the device functional unit 370 notifies the second control unit 350 about the direction in which the louver 171 is facing (the direction in which the wind is blowing). The second control unit 350 conveys, to the sensor 120, the direction in which the louver 171 is facing, notified by the device functional unit 370. By having such a configuration, the sensor 120 can be operated in accordance with the position of the louver 171.

Figure 18:
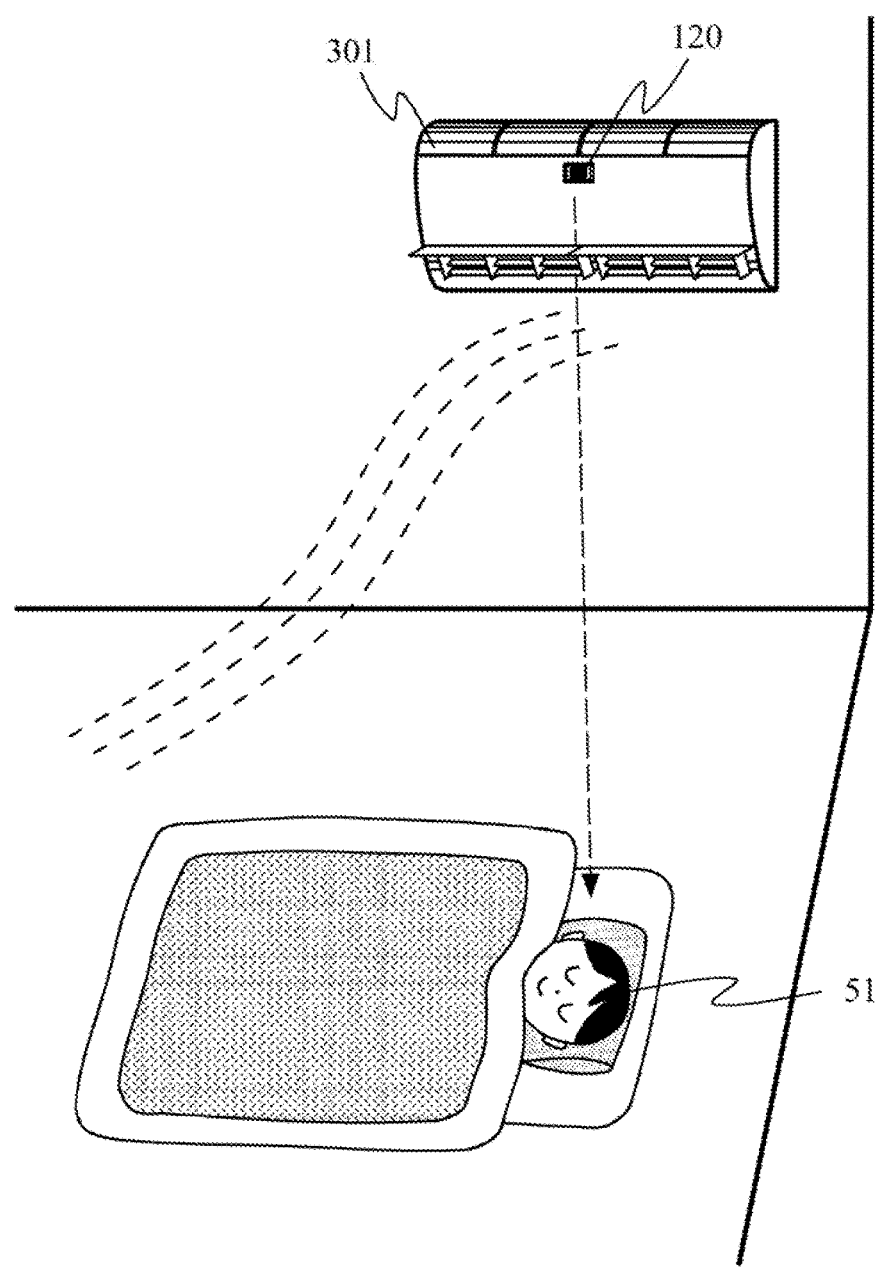
FIG. 18 is for describing one example of a louver control achieved by the air conditioning appliance 301.

FIG. 18 shows an example regarding how the air conditioning appliance 301 is used. In this example, the temperature distribution of the face of the sleeper 51 is measured by the sensor 120 at a timing when the wind blown out from the louver 171 does not directly hit the sleeper 51. By doing so, it is possible to prevent the sensor 120 from measuring a state at which the temperature of the surface of the sleeper 51 temporarily decreases due to the wind hitting the sleeper 51. As a result, variation of temperature between measurements can be reduced, and accuracy for measuring the temperature can be improved. It is needless to say that, at a timing when wind is not directly hitting the sleeper 51, the temperature may be measured by the sensor 120 in synchronization with a timing when the louver 171 faces a predetermined direction. By doing so, even if the wind blown out from the louver 171 indirectly hits the sleeper 51, an advantageous effect of being able to reduce variation of the measurement can be obtained since the measurement of the temperature is performed with the same condition every time.

When the presence of a person and the person getting in the bedding are detected by the processing by the sensor 120 and the first control unit 130, the wind volume of the fan 173 may be reduced via the second control unit 350. By doing so, even if the wind blown out from the louver 171 indirectly hits the sleeper 51, an advantageous effect of being able to reduce variation of the measurement can be obtained.

Here, whether the person is in the bedding may be determined based on the body movement amount as shown in (c) of FIG. 10. Since the body movement amount when being in the bedding is small compared to when being awake, the person can be regarded as being in the bedding when the body movement amount becomes equal to or smaller than a certain value. Other than that, for example, the person may be determined to be in the bedding also when, in the state where the presence of the person is detected, the size of the area of a temperature region whose temperature is equal to or higher than a certain temperature becomes equal to or smaller than a certain size. It is needless to say that other methods may be used as long as the person can be determined to be in the bedding, and the person may transmit that information to the air conditioning appliance using the operation unit 160 (a remote control or the like).

Figure 19:
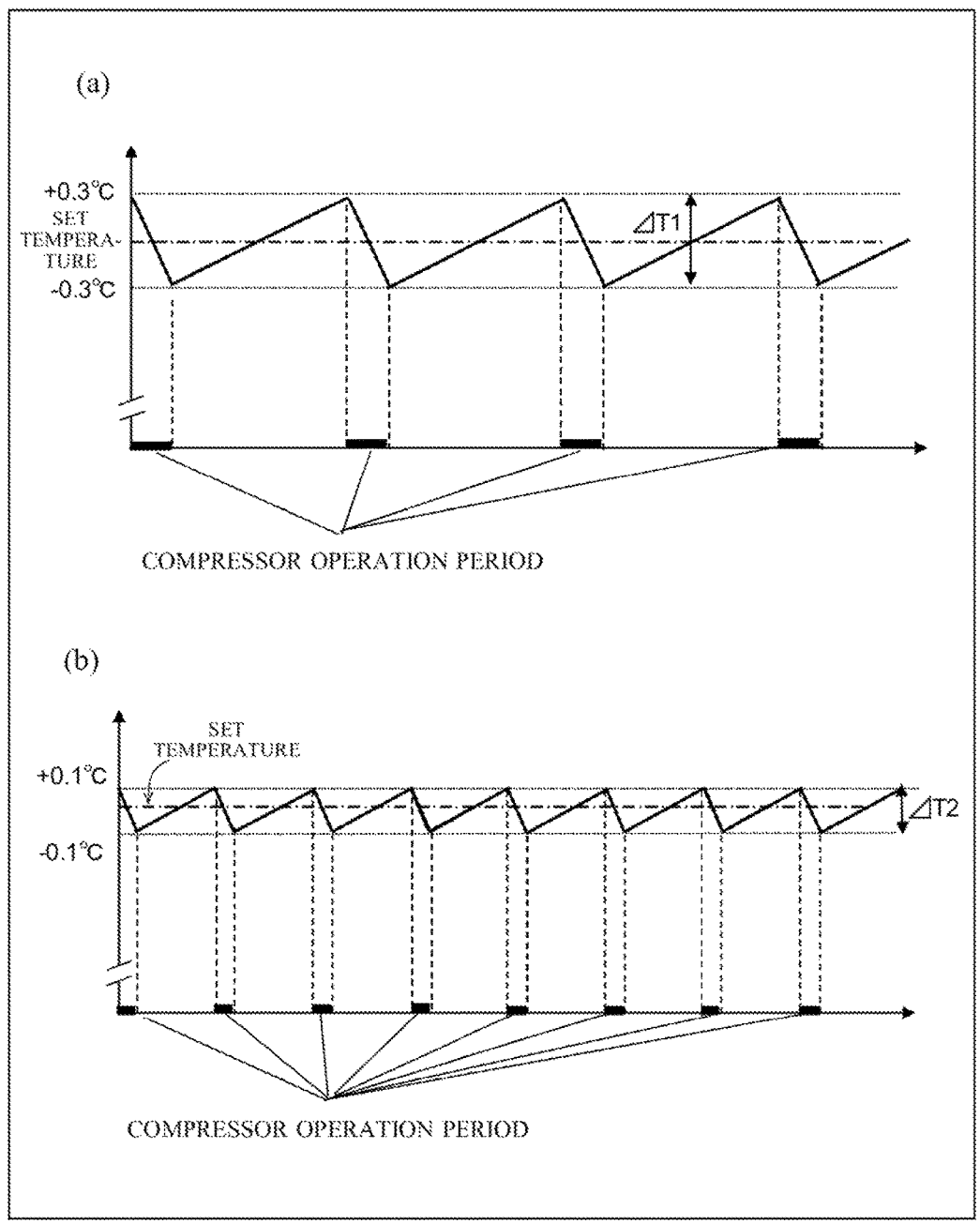
FIG. 19 is for describing one example of a compressor control achieved by the air conditioning appliance 301.

Ordinarily in the air conditioning appliance 301, the compressor 172 is operated when the second control unit 350 determines that the temperature has deviated from the temperature set by the sensor 120 by a predetermined temperature or more. As a result, the period in which the compressor operates becomes discrete as shown in, for example, (a) of FIG. 19. Shown in (a) of FIG. 19 is a case in which the operation of the compressor 172 is turned ON/OFF when the temperature deviates by, for example, set-temperature ±0.3° C. (temperature control range $\Delta T1=0.6°$ C.) or more. During and around the REM sleep, since the function of autonomic nerves decreases as described above and the body surface temperature is easily affected by the environmental temperature, a more precise temperature control is preferable. Thus, when the person is determined to be in the bedding by the processing by the sensor 120 and the first control unit 130 as described above, the control may be performed by, for example, setting the control temperature range to $\Delta T2=0.2$ so as to be smaller than that during ordinary drive as shown in (b) of FIG. 19. By doing so, even during and around the REM sleep, the body temperature of the sleeper 51 can be controlled precisely and thereby a more comfortable sleep can be provided. It should be noted that the temperature control range described herein is merely one example and is not limited thereto.

Furthermore, the timing at which the operation of the compressor 172 is turned ON/OFF may be synchronized with the timing of REM sleep/non REM sleep obtained from the result of processing by the first control unit 130. By doing so, a more comfortable sleep is obtained. The timing of REM sleep/non REM sleep may be determined from the body movement amount extracted from the thermal image by the first control unit 130 or may be determined from a body temperature fluctuation cycle of a peripheral part such as the nose part, and the means for that is not limited.

Fourth Embodiment

Although the state has been detected by the first control unit 130 or 230 from the information obtained by the sensor 120, the state may be received from other devices.

Figure 20A:
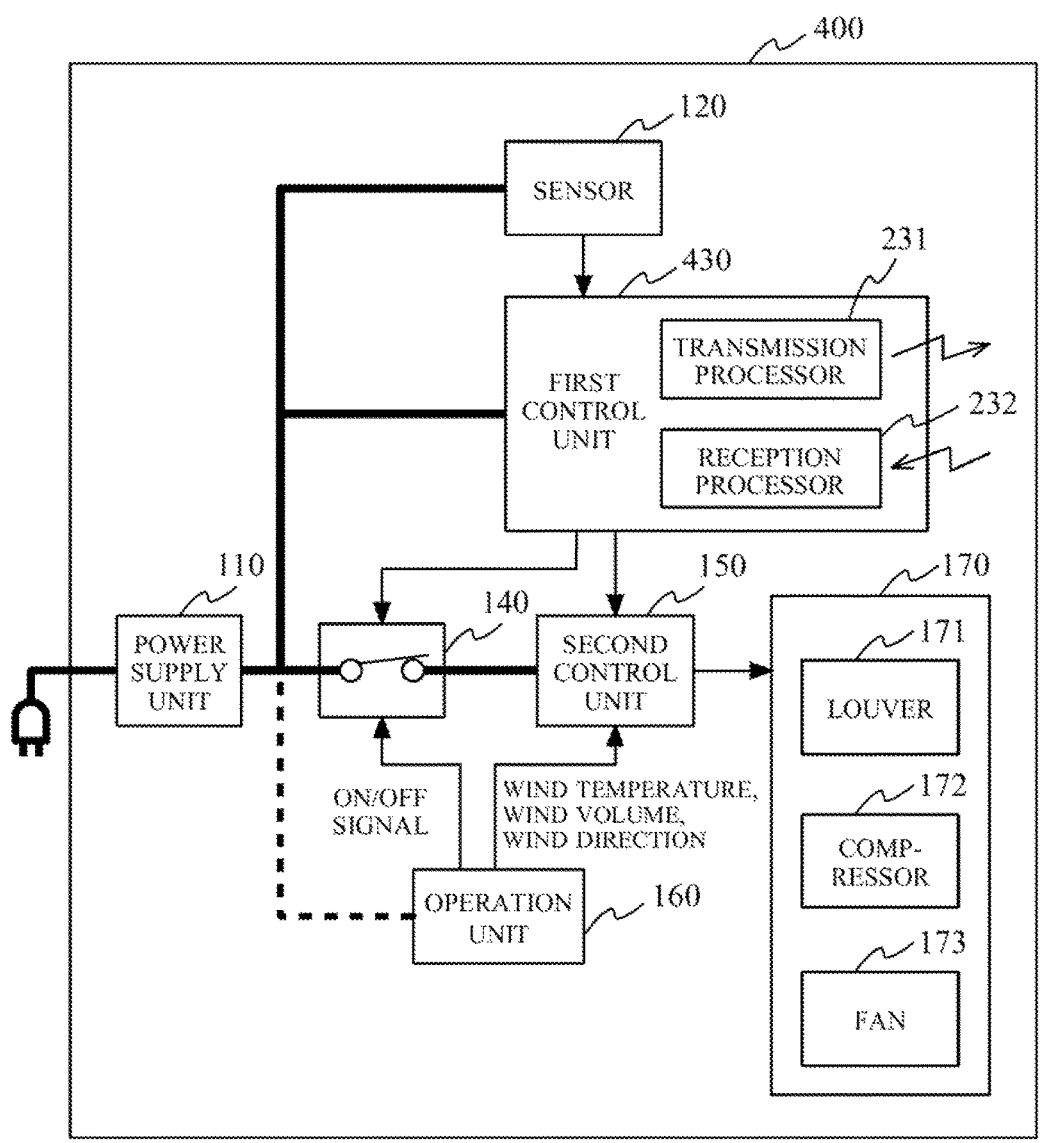
FIG. 20A shows the configuration of an air conditioning appliance 400 according to a fourth embodiment.

FIG. 20A shows the configuration of an air conditioning appliance 400 of a fourth embodiment, also including a first control unit 430 having the transmission processor 231 and a reception processor 232. The reception processor 232 is formed from, for example, a receiver for receiving wireless radio waves and a controller for controlling the receiver, etc.

In the air conditioning appliance 400 shown in FIG. 20A, information from other devices can be obtained through the reception processor 232. For example, during sleep, the air conditioning appliance 400 can acquire signals related to the state of the sleeper 51 using a mattress type sensor placed below the mattress 53b for sensing body movement, or a wrist watch type sensor installed with an accelerometer and fitted to an arm of the sleeper 51, etc. The air conditioning appliance 400 may control the device functional unit 170 based on information acquired from other devices. By doing so, accuracy of detection can be further improved, and a further comfortable environment can be provided.

Figure 20B:
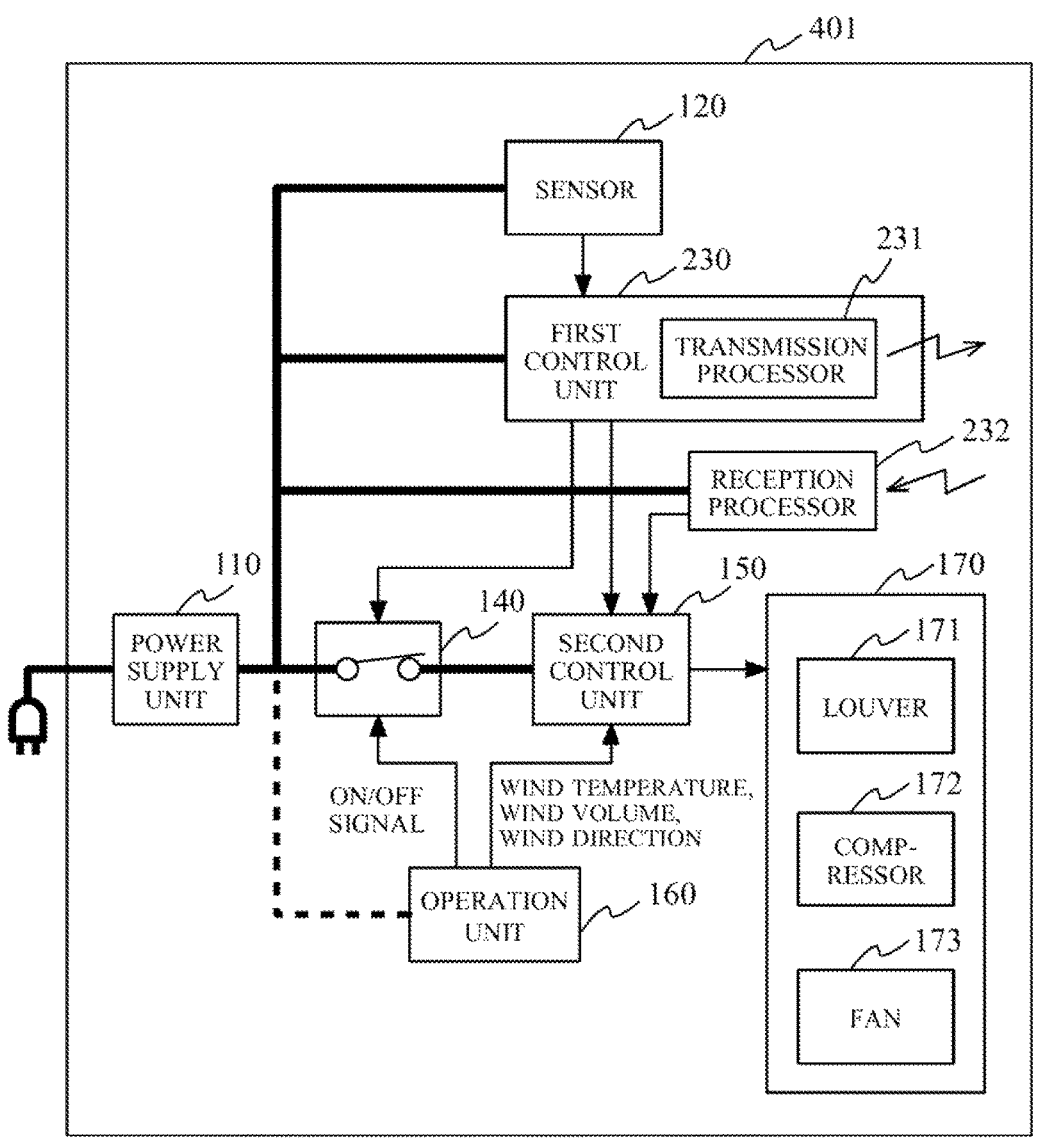
FIG. 20B shows the configuration of another air conditioning appliance 401 according to a fourth embodiment.

In the example in FIG. 20A, although a configuration in which the reception processor 232 includes the first control unit 430 is shown, the reception processor 232 may be a component independent from the first control unit 430 as shown in an air conditioning appliance 401 in FIG. 20B. By using this configuration, apart from the control by the first control unit 430, the second control unit 150 can be controlled based on information acquired from other devices.

Fifth Embodiment

Figure 21:
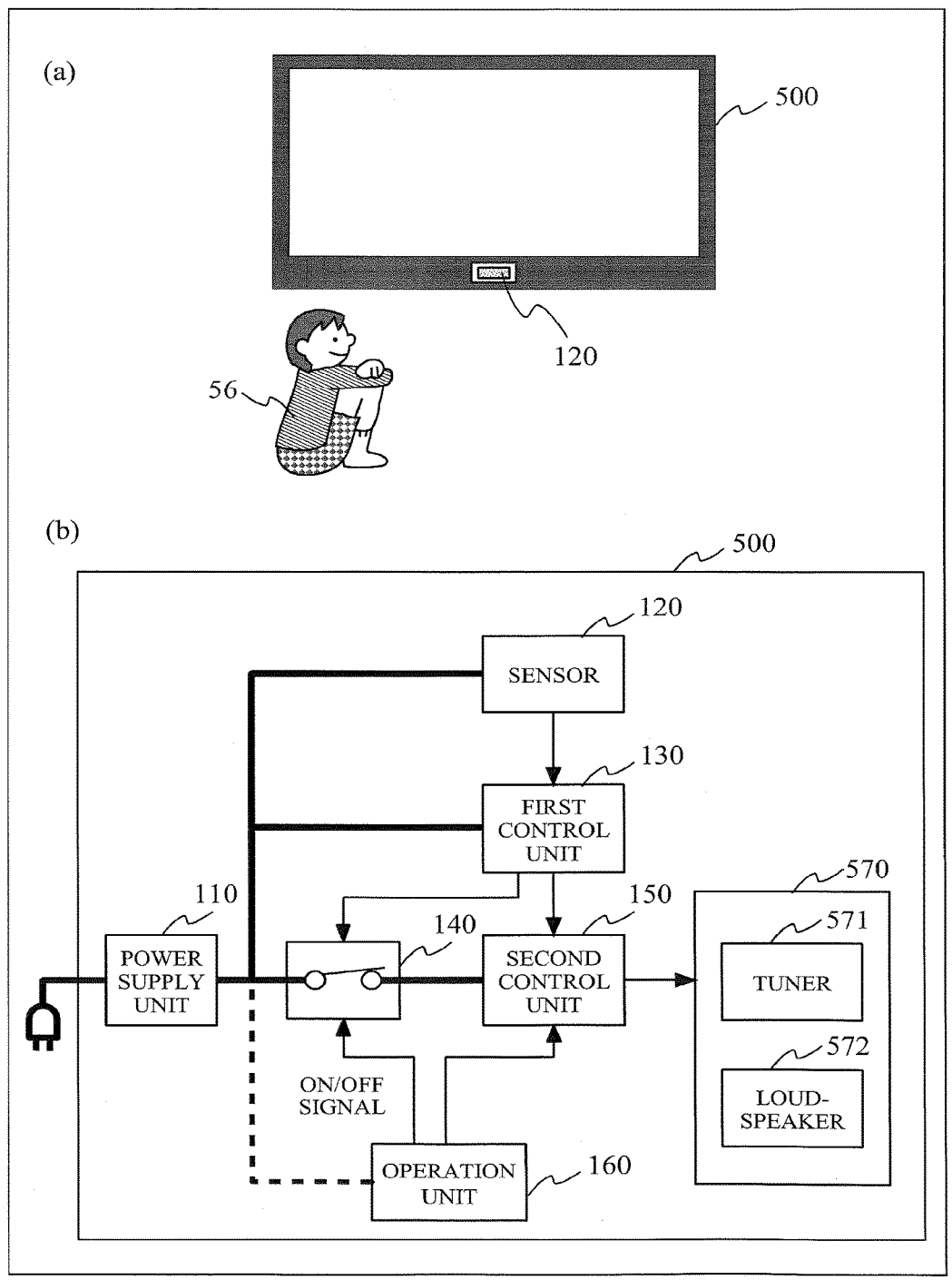
FIG. 21 is for describing the configuration of a display appliance 500 according to a fifth embodiment.

In each of the above described embodiments, the air conditioning appliance has been used as a device equipped with a sensor. In a fifth embodiment, a case in which a display appliance 500 equipped with the sensor 120 as shown in (a) of FIG. 21 is used will be described.

First, by using (b) of FIG. 21, the configuration of the display appliance 500 will be described.

The display appliance 500 includes the power supply unit 110, the sensor 120, the first control unit 130, the switching unit 140, the second control unit 150, the operation unit 160, and a device functional unit 570. The device functional unit 570 includes a tuner 571 and a loudspeaker 572, etc. It should be noted that the components of the device functional unit 570 are merely examples, and other components may be included or part of the components may be omitted. Similarly to the configuration of the air conditioning appliance 100 according to the first embodiment shown in FIG. 2, also in the display appliance 500, power to the sensor 120 and the first control unit 130 is directly supplied from the power supply unit 110 not through the switching unit 140, and the temperature distribution inside the room can be continuously measured even when the switching unit 140 is turned OFF.

The display appliance 500 of the fifth embodiment utilizes basically the same concept for control as the air conditioning appliance 100 of the first embodiment, only being different regarding the device functional unit 570 which is the object of the control. Since components other than the device functional unit 570 are identical to those in the air conditioning appliance 100, descriptions of those are omitted.

The second control unit 150 is connected to the device functional unit 570, and, based on a control content received from the first control unit 130, can select a display content using the tuner 571 and adjust the volume using the loudspeaker 572. For example, when a viewer 56 arrives in front of the display appliance 500 as shown in (a) of FIG. 21 while the display appliance 500 is shut down, the first control unit 130 extracts the presence of the person based on information (data) obtained from the sensor 120. By doing so, the first control unit 130 can switch the switching unit 140 to the ON-state, start up the display appliance 500, and display an image. By doing so, the viewer 56 can view the image without operating the operation unit 160 such as a remote control.

In addition, while the image on the display appliance 500 is viewed, the first control unit 130 can estimate, based on information (image) obtained from the sensor 120, the age of the viewer 56 from, for example, the size of the face. Furthermore, based on the estimated age, the first control unit 130 may recommend programs by displaying programs suited for the age group on the screen.

Furthermore, based on the information obtained by the sensor 120, the first control unit 130 can perform a control as described next when the position of the viewer 56 is extracted.

When the display appliance 500 is an appliance equipped with right and left stereo loudspeakers, the first control unit 130 can control the second control unit 150 to adjust the balance of the right and left loudspeakers based the extracted position of the viewer 56. With this, no matter where the viewer 56 is viewing the appliance, sound with realistic sensation can be constantly provided.

Furthermore, when the display appliance 500 is an appliance having a function of adjusting the direction of the screen on which an image is shown, the first control unit 130 can control the second control unit 150 and direct the screen toward the viewer 56. By doing so, visibility of the display appliance 500 for the viewer 56 is not lost.

Furthermore, although the display appliance 500 does not include a transmission processor or a reception processor, the display appliance 500 may include the transmission processor 231 and the reception processor 232 as described in the second and third embodiments to communicate with other devices. In addition, as described in the second embodiment, the appliance may cooperate with a wind-blowing appliance, an illumination appliance, or a cleaning appliance, etc., having a receiver, or may cooperate with other devices, and the combination is not limited thereto.

In the control by the appliance configuration describe in the first to fifth embodiments above, it is conceivable that an instruction (control) for the switching unit 140 and the second control unit 150 by the first control unit 130, and an instruction (control) of the switching unit 140 and the second control unit 150 by the operation unit 160 may compete or may be in conflict with each other. This can be dealt by, for example: setting a rule for the appliances for prioritizing one of the instructions; or providing a "sensor mode" for having the control performed automatically and a "user mode" for having the control performed manually (an operation using a remote control or timer, etc.), and allowing the user to switch therebetween.

Furthermore, in the appliance configuration described in the first to fifth embodiments above, the first control unit 130 and the second control unit 150 have been described as being separate. However, the first control unit 130 and the second control unit 150, as long as they are functionally independent, does not necessarily have to be physically independent, and may be, for example, formed on a single IC chip with independent power supply systems to form a semiconductor.

It should be noted that the components and the connection mode of the components shown in each of the above described embodiments are examples, and the present invention is not limited thereto. It is needless to say that, without departing from the scope of the present invention, the components and the connection mode thereof may be expanded to other devices, modified in various ways, or combined. An essential component of the present invention is limited by an independent claim indicating a most generic concept. Thus, a component described in the embodiments but not described in an independent claim is not essential and is described as one example of the embodiments.

INDUSTRIAL APPLICABILITY

The sensor mounting device of the present invention, although having a simple configuration, can largely improve convenience of the device.

DESCRIPTION OF THE REFERENCE CHARACTERS 10 device
100, 200, 300, 301, 400, 401, 1000 air conditioning appliance
12, 120, 1200 sensor
51, 54, 55, 56 person (sleeper, room-entering person, viewer)
53 bedding
53a bed cover
53b mattress
110, 1100 power supply unit
121, 122 temperature sensor
121a, 122a substrate
121b, 122b infrared detection element array
121c, 121d shaft
121e, 122e infrared detection element
121f, 122f, 122g lens 122h zoom lens
130, 230, 430, 1300 first control unit
140, 1400 switching unit
150, 350 second control unit
160 operation unit
170, 370, 570 device functional unit
171 louver
172 compressor
173 fan
231 transmission processor
232 reception processor
281 router
282 receiver-equipped fan
283 index functional unit
284 receiver-equipped illumination device
285 receiver-equipped vacuum cleaner
306 vascular part
307 nonvascular part
500 display device
571 tuner
572 loudspeaker

The invention claimed is:

1. An air conditioning appliance equipped with a sensor, the air conditioning appliance comprising:
the sensor configured to acquire information regarding temperature distribution of a space in which the air conditioning appliance is provided; and
a controller (i) configured to detect whether or not a person in the space is in a sleeping state from the information, (ii) configured to, when it has been detected that the person is in a sleeping state, control the air conditioning appliance such that an operation sound indicating that the air conditioning application is starting up or shutting down generated when starting up or shutting down the air conditioning appliance is not produced, and (iii) configured to, when it has been detected that the person is not in the sleeping state, control the air conditioning appliance such that the operation sound indicating that the air conditioning application is starting up or shutting down generated when starting up or shutting down the air conditioning appliance is produced.

2. The air conditioning appliance according to claim 1, wherein
the sensor is a thermal image sensor, and the information is a thermal image acquired by the thermal image sensor.

3. The air conditioning appliance according to claim 2, wherein
the controller measures, based on the information regarding the temperature distribution, an amount of body movement which is an amount by which the person has moved, and detects whether or not the person is in a sleeping state by use of the amount of body movement.

4. The air conditioning appliance according to claim 2, wherein
the controller measures a body surface temperature of the person from the information regarding the temperature distribution, and detects whether or not the person is in a sleeping state from the body surface temperature.

5. The air conditioning appliance according to claim 1, wherein
the controller measures, based on the information regarding the temperature distribution, an amount of body movement which is an amount by which the person has moved, and detects whether or not the person is in a sleeping state by use of the amount of body movement.

6. The air conditioning appliance according to claim 1, wherein
the controller measures a body surface temperature of the person from the information regarding the temperature distribution, and detects whether or not the person is in a sleeping state from the body surface temperature.

7. The air conditioning appliance according to claim 6, wherein
the body surface temperature of the person is a skin temperature of a nose part, a cheek part, or a hand of the person.

8. The air conditioning appliance according to claim 1, wherein
the controller is further configured to, when it has been detected that the person is in the sleeping state, control the air conditioning appliance such that generation of noise is reduced by moderating the operation of a compressor, a louver, or a fan.

9. A method for controlling an air conditioning appliance equipped with a sensor, the method comprising:
acquiring, by the sensor, information regarding temperature distribution of a space in which the air conditioning appliance is provided;
detecting whether or not a person in the space is in a sleeping state from the information regarding the temperature distribution;
performing, when it has been detected that the person is in a sleeping state, controlling of the air conditioning appliance such that an operation sound indicating that the air conditioning application is starting up or shutting down generated when starting up or shutting down the air conditioning appliance is not produced; and
performing, when it has been detected that the person is not in the sleeping state, controlling of the air conditioning appliance such that the operation sound indicating that the air conditioning application is starting up or shutting down generated when starting up or shutting down the air conditioning appliance is produced.

* * * * *